(12) United States Patent
Larsen

(10) Patent No.: US 10,017,265 B1
(45) Date of Patent: Jul. 10, 2018

(54) REPLACEABLE POWER MODULES ON AERIAL VEHICLES

(71) Applicant: Amazon Technologies,, Inc., Seattle, WA (US)

(72) Inventor: Glen C. Larsen, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 15/181,254

(22) Filed: Jun. 13, 2016

(51) Int. Cl.
  *B64D 27/24* (2006.01)
  *B64D 39/00* (2006.01)
  *B64F 1/36* (2017.01)
  *B64C 39/02* (2006.01)

(52) U.S. Cl.
  CPC ............ *B64D 27/24* (2013.01); *B64C 39/024* (2013.01); *B64D 39/00* (2013.01); *B64F 1/36* (2013.01); *B64C 2201/042* (2013.01); *B64C 2201/063* (2013.01); *B64C 2201/066* (2013.01); *B64C 2201/108* (2013.01)

(58) Field of Classification Search
  CPC ... B64F 1/36; B64F 1/00; B64D 39/00; B64C 2201/06; B64C 2201/063; B64C 2201/066; B64C 2201/18
  See application file for complete search history.

(56) References Cited

U.S. PATENT DOCUMENTS

| 8,899,903 B1* | 12/2014 | Saad ..................... B64C 39/024 |
| | | 414/392 |
| 9,714,012 B1* | 7/2017 | Hoareau ............... B64C 39/024 |
| 2017/0120763 A1* | 5/2017 | Henry ................... B64C 39/024 |
| 2017/0283090 A1* | 10/2017 | Miller .................. B64C 39/024 |

* cited by examiner

*Primary Examiner* — Richard R Green
(74) *Attorney, Agent, or Firm* — Athorus, PLLC

(57) ABSTRACT

An aerial vehicle may receive electrical power from power modules that may be installed into or removed from the aerial vehicle during flight operations. Such power modules may be inserted into a chamber from below the aerial vehicle and may come into contact with one or more terminals or leads for powering propulsion motors or other electrical loads. Such power modules may also be removed from above the aerial vehicle, thereby uncoupling the power modules from the electrical loads. Power modules may be installed into or removed from a chamber using tension members that are guided into the chamber from lateral slots extending between a perimeter of the aerial vehicle and the chamber. The tension members may be used to not only engage and remove a power module within the chamber but also to install a power module into the chamber.

20 Claims, 22 Drawing Sheets

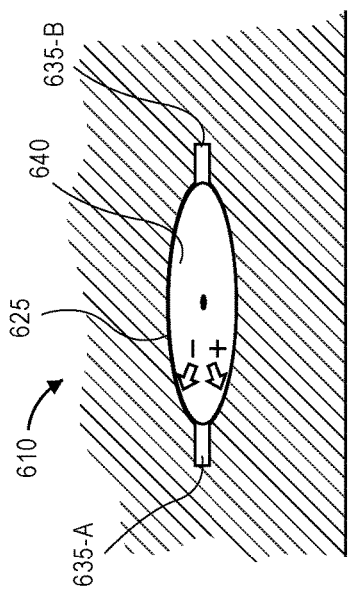
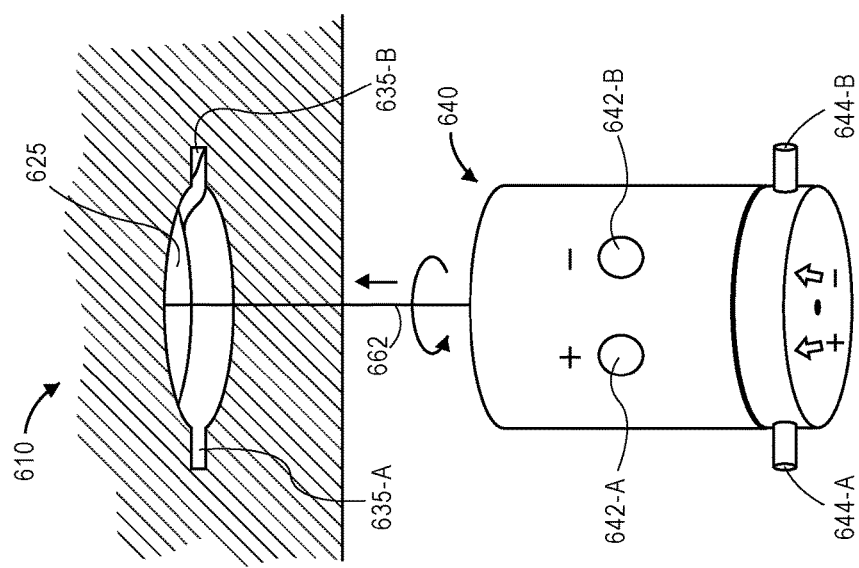
FIG. 6C
FIG. 6B

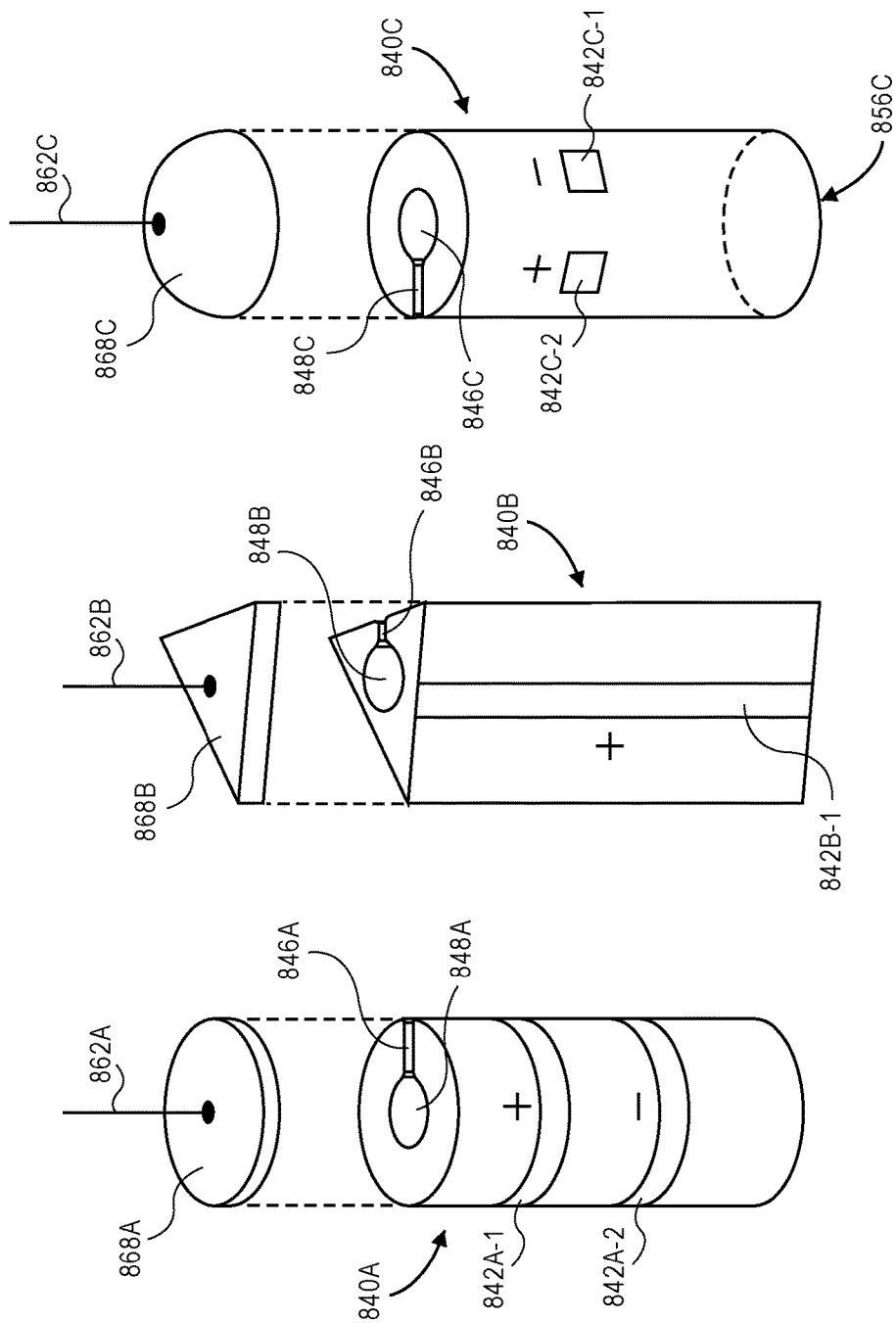

REPLACEABLE POWER MODULES ON AERIAL VEHICLES

BACKGROUND

Unmanned aerial vehicles (or UAVs) are being utilized in an ever-increasing number of operations, including but not limited to surveillance, monitoring or delivery applications. Many such aerial vehicles use electrical components such as motors, control surfaces or cameras that are powered by batteries or other direct current (DC) power cells when engaged in flight. For example, a typical UAV may include one or more brushless DC motors that are coupled to propellers for generating forces of lift or thrust on the UAV during operation.

Where batteries are used to generate electric power for DC motors or other components that are provided aboard a UAV, such batteries must, like all batteries, be recharged from time to time. Typically, a battery for powering DC motors or other components aboard a UAV is installed in the UAV in a fully or properly charged condition, and is removed on a periodic or as-needed basis, i.e., when the level of stored electrical energy in the battery is insufficient to complete an upcoming mission, plus an additional margin for safety or contingencies. The battery may then be recharged and reinstalled into the UAV from which the battery was removed, or into another UAV, e.g. a UAV of a similar type or class.

Batteries are typically installed into UAVs using one or more mechanical fasteners that must be manually actuated by a technician. For this reason, batteries having low or insufficient levels of charge are typically removed and replaced while a UAV is grounded. Once a battery has been replaced, the UAV may take off and complete its current mission, or embark upon a new mission.

The operational efficiency of a UAV having one or more battery-powered DC motors and/or other electrical components is enhanced where the UAV may remain in a properly charged state at all times, or where the UAV may be restored to a fully charged or a nearly fully charged state as promptly as possible when a battery requires replacement. Presently, an electrically powered UAV is unable to complete any missions while a battery is being removed or replaced.

BRIEF DESCRIPTION OF THE DRAWINGS

FIGS. 6A through 6C are views of aspects of one system including an aerial vehicle having a replaceable power module in accordance with embodiments of the present disclosure.

FIGS. 8A through 8C are views of replaceable power modules in accordance with embodiments of the present disclosure.

DETAILED DESCRIPTION

As is set forth in greater detail below, the present disclosure is directed to aerial vehicles having one or more replacement power modules, and systems and methods for electronically "refueling" such aerial vehicles by replacing one or more power modules provided thereon in flight. More specifically, the systems and methods disclosed herein include aerial vehicles having cavities or chambers for receiving and accommodating power modules therein. In some embodiments, the power modules of the present disclosure may include batteries or battery packs having dimensions or cross-sectional areas that are sized for releasable insertion into and removal from corresponding cavities or chambers of an aerial vehicle. Additionally, the power modules may include one or more terminals, leads or other contact points on external surfaces that are aligned to contact one or more corresponding terminals, leads or contact points on internal surfaces of such cavities or chambers when the modules are inserted therein, thereby electrically coupling such modules with one or more electrical loads or circuits provided aboard the aerial vehicle. Power modules may be removed from operating aerial vehicles, or installed into such aerial vehicles, by engagement with tension members or other components of transfer stations while the aerial vehicles are in flight. Transfer stations may be equipped with one or more power modules and mounted to any form of ground-based structure, or provided aloft by one or more other aerial vehicles.

Figure 1A:
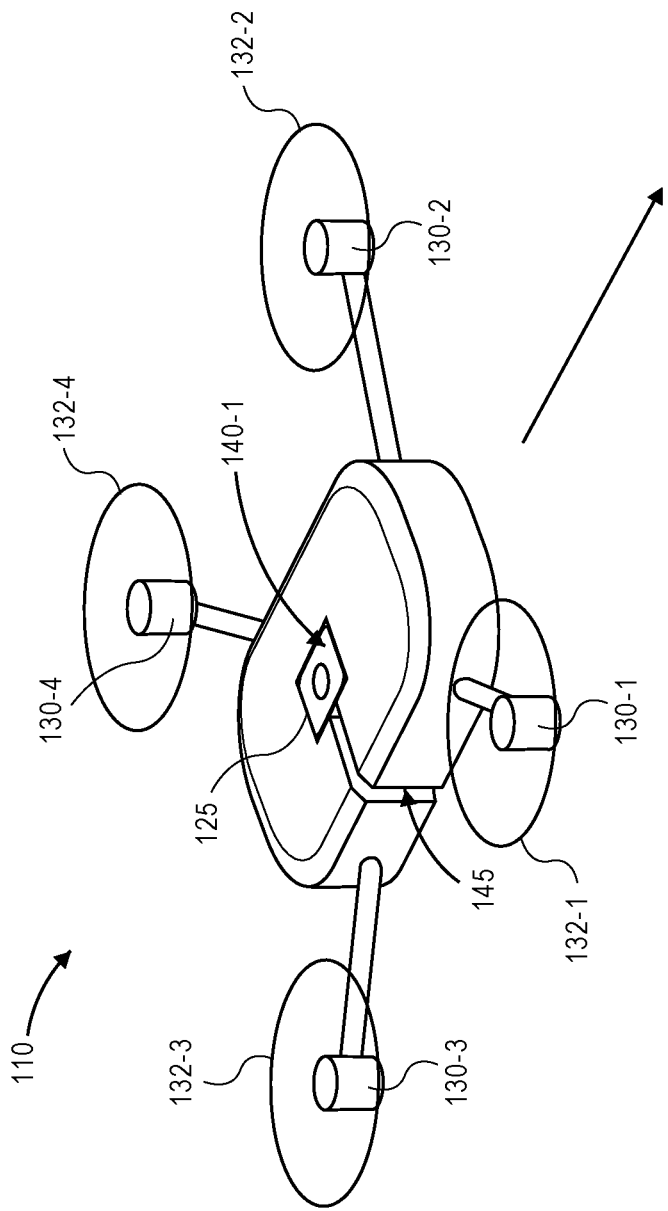
FIGS. 1A through 1G are views of aspects of one system including an aerial vehicle having a replaceable power module in accordance with embodiments of the present disclosure.

Referring to FIGS. 1A through 1G, views of aspects of one system 100 including an aerial vehicle 110 having a power module 140-1 and a transfer station 150 in accordance with embodiments of the present disclosure are shown. As is shown in FIG. 1A, the aerial vehicle 110 includes a frame having a plurality of motors 130-1, 130-2, 130-3, 130-4 and the power module 140-1 embedded within a chamber 125. Each of the motors 130-1, 130-2, 130-3, 130-4 is coupled to a propeller 132-1, 132-2, 132-3, 132-4 and is configured to rotate about a substantially vertical axis under power, thereby generating forces of lift or thrust on the aerial vehicle 110 during operation.

As is also shown in FIG. 1A, the chamber 125 has a substantially square cross section and is centered along horizontal and vertical centerlines of the aerial vehicle 110, which includes a slot 145 extending laterally from one side of the aerial vehicle 110 to the chamber 125. The chamber 125 includes front, rear, left and right sides, and extends between openings on an upper side of the aerial vehicle 110 and on a lower side of the aerial vehicle 110. The power module 140-1 includes a substantially square cross section that corresponds to the substantially square cross section of the chamber 125. As is shown in FIG. 1A, the power module 140-1 is releasably mounted to or suspended within the chamber 125 between the respective front, rear, left and right sides of the power module 140-1 and the chamber 125, in mating contact with one another.

Figure 1B:
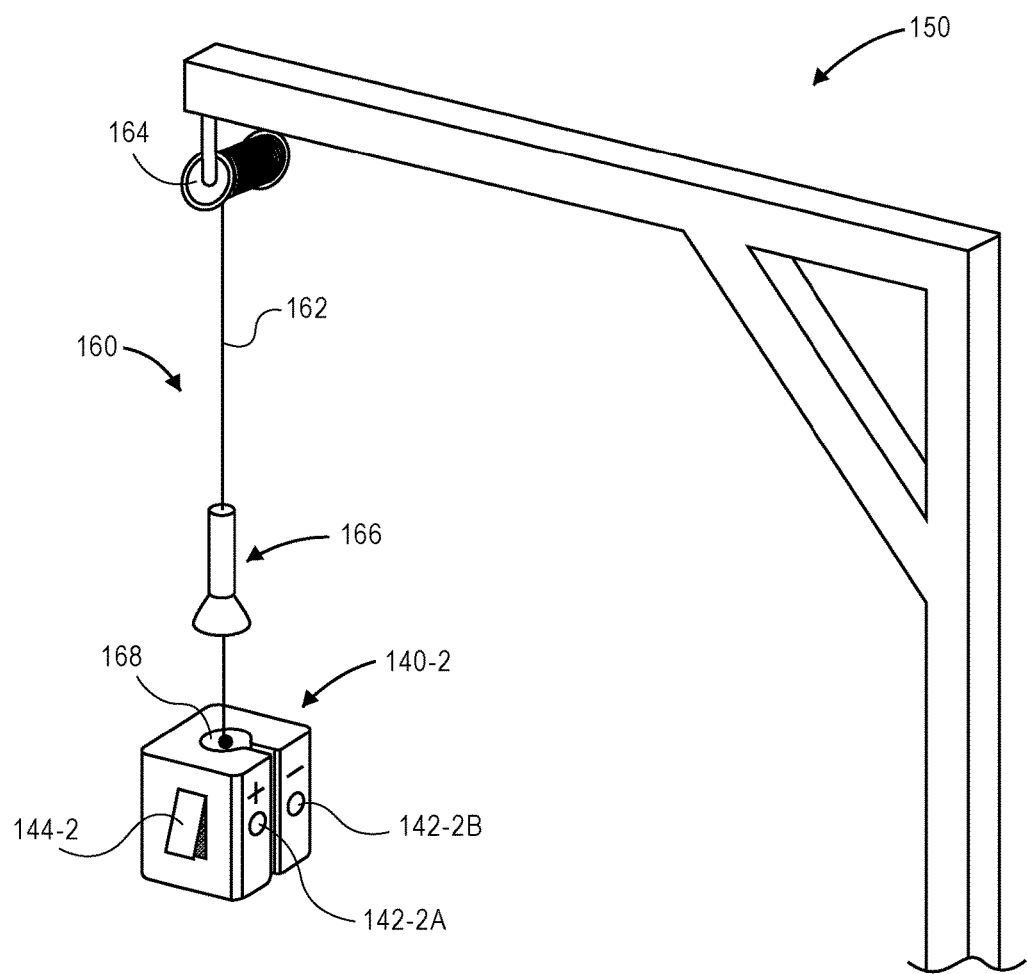
Figure 1C:
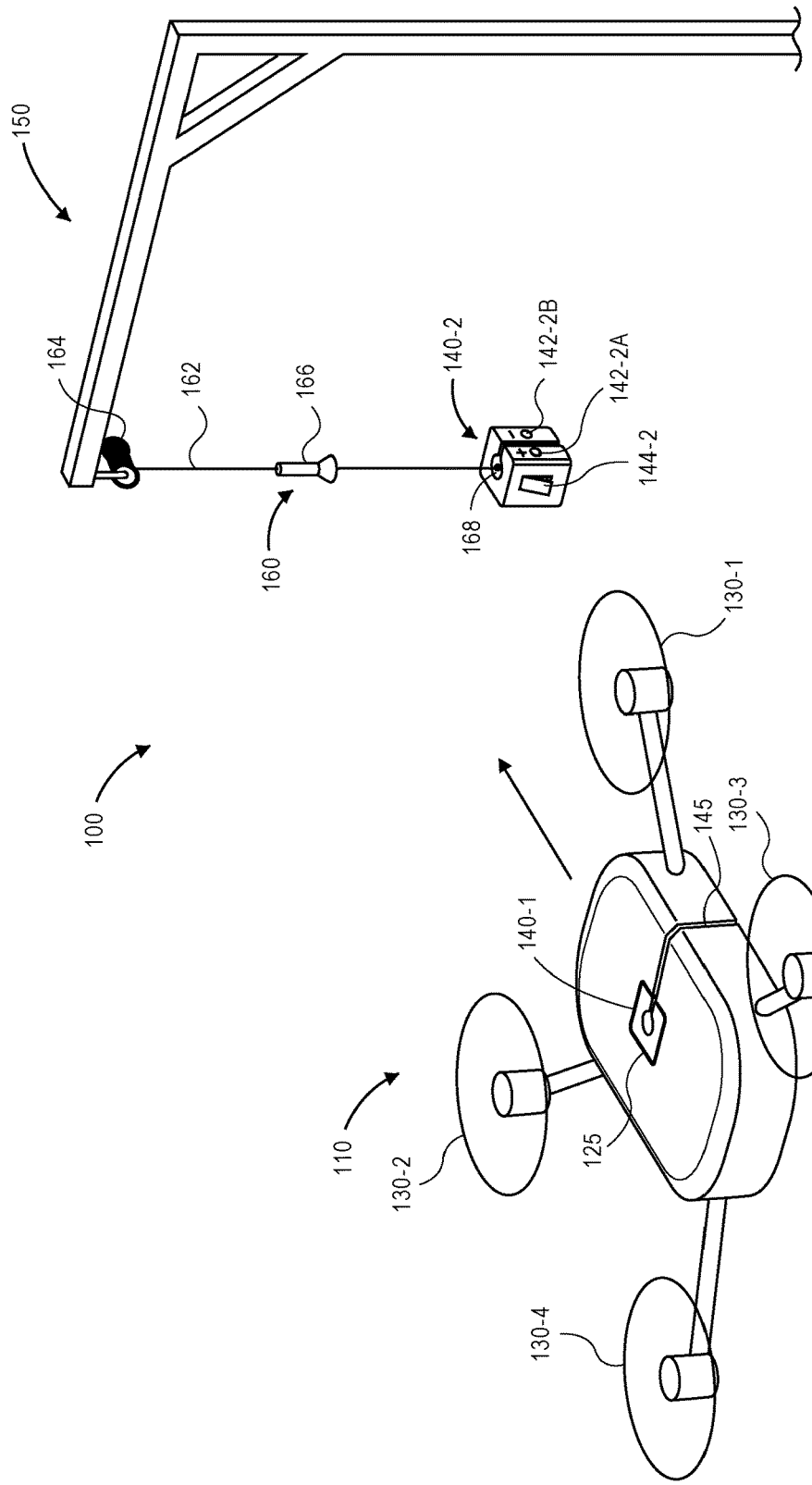

As is shown in FIGS. 1B and 1C, the transfer station 150 includes an installation mechanism 160 comprising a tension member 162, an adjustable winch 164, an engagement capsule 166 and a releasable connector 168. The tension member 162 may be any form of natural or synthetic rope, chain, cable, string, tape or other element that extends in tension between the winch 164, the engagement capsule 166 and the releasable connector 168. Additionally, the releasable connector 168 is joined to a power module 140-2 having a pair of power terminals 142-2A, 142-2B (e.g., positive and negative terminals) and a retractable latch 144-2. The releasable connector 168 may releasably engage with the power module 140-2 in any manner that would enable the releasable connector 168 to disengage from the power module 140-2 when the power module 140-2 is properly installed within an aerial vehicle, or at any other relevant time. For example, the releasable connector 168 may be configured to engage with a power module by any mechanical, magnetic or other connecting components or features, and also to disengage from the power module as desired, e.g., when a resistive force exceeding a predetermined threshold is met. In some embodiments, the tension member 162 includes a powered conductor, e.g., for charging a power module disposed thereon, such as the power module 140-2, or for activating the releasable connector 168 to engage or release a power module, such as the power module 140-2. In other embodiments, the tension member 162 is a sheathed cable.

Figure 1D:
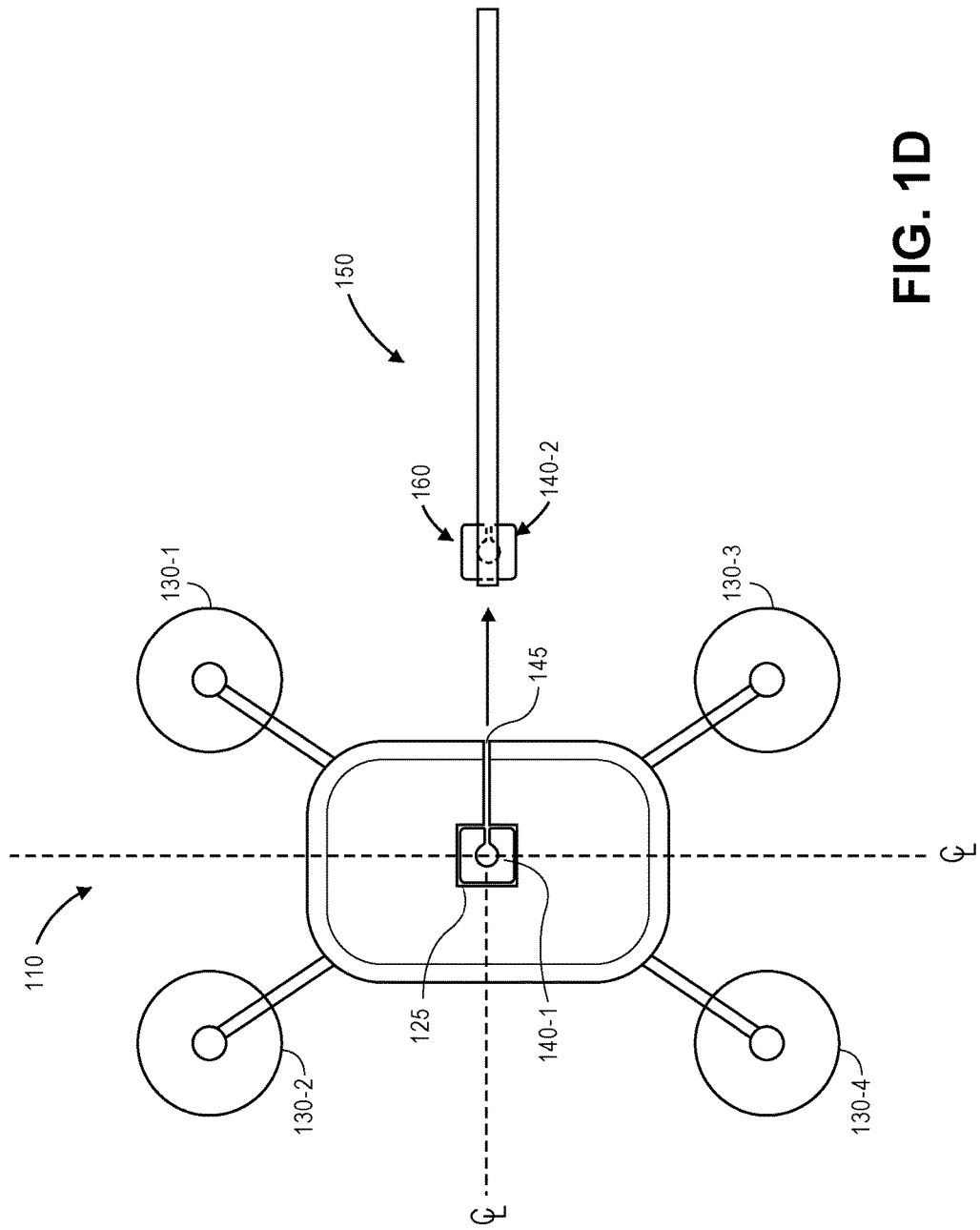

In accordance with the present disclosure, aerial vehicles may have their onboard power modules removed or replaced by engagement with a ground-based or airborne transfer station having one or more replacement power modules ready thereby. As is shown in FIG. 1C, the aerial vehicle 110 may approach the transfer station 150 with the slot 145 on a side of the transfer station 150 (viz., a starboard side of the aerial vehicle 110). As is shown in FIG. 1D, which includes a top view of the aerial vehicle 110 and the transfer station 150, the aerial vehicle 150 may position itself with respect to the installation mechanism 160 such that the tension member 162 of the installation mechanism 160 is aligned with the slot 145 of the aerial vehicle 110, and may be received therein.

Figure 1E:
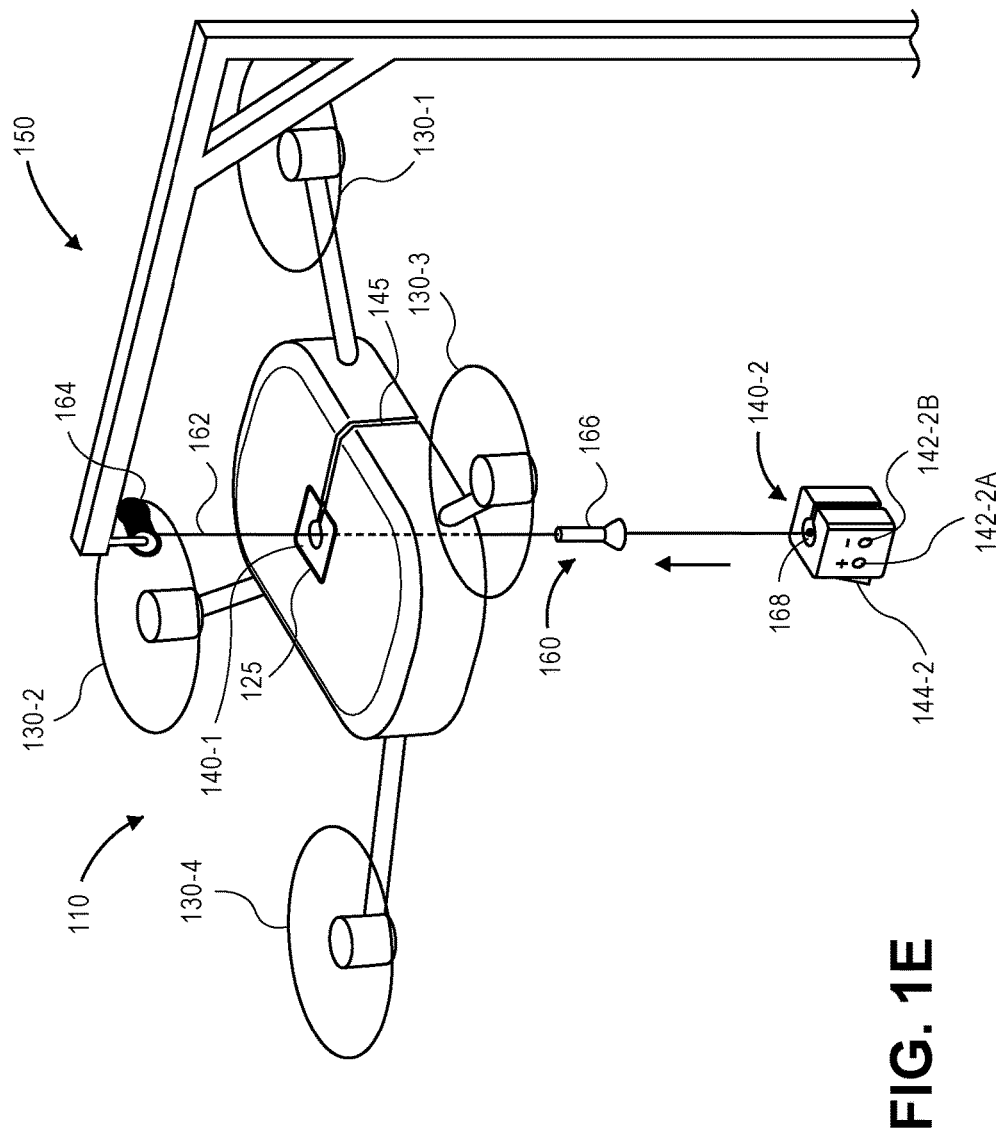

As is shown in FIG. 1E, once the tension member 162 has been received within the slot 145 and inserted into a central region of the power module 140-1 within the chamber 125, the tension member 162 may be placed into relative vertical motion with respect to the aerial vehicle 110, in order to remove the power module 140-1 from the aerial vehicle 110 or to install the power module 140-2 into the aerial vehicle 110. For example, as is shown in FIG. 1E, the aerial vehicle 110 may initiate a hovering operation, and the winch 164 may elevate the tension member 162, thereby causing the engagement capsule 166 to rise with respect to the aerial vehicle 110. Alternatively, the tension member 162 could remain fixed in its position, and the aerial vehicle 110 could initiate a descending operation, thereby causing the aerial vehicle 110 to fall with respect to the tension member 162 and the engagement capsule 166.

Figure 1F:
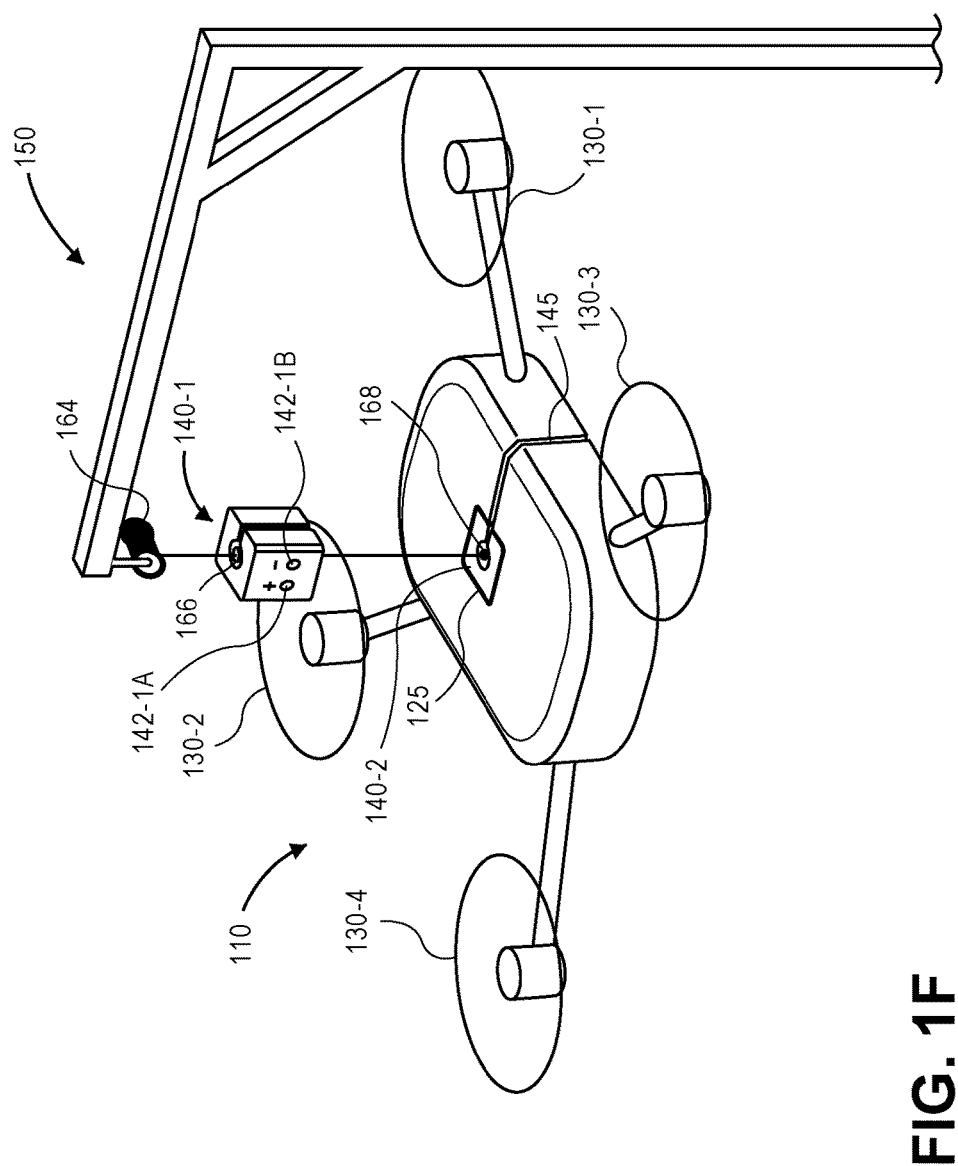
Figure 1G:
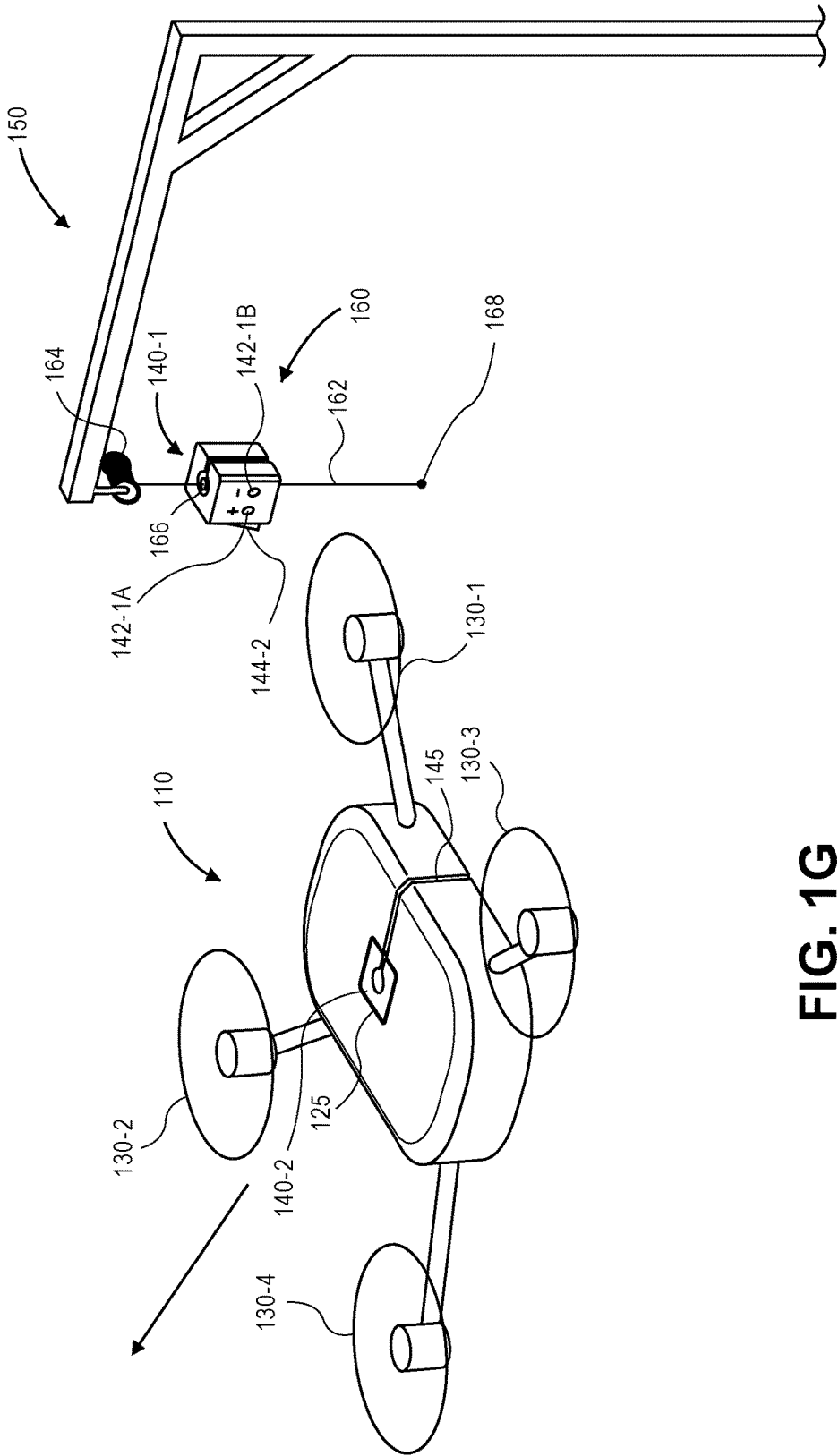

As is shown in FIG. 1F, elevating the tension member 162 with respect to the aerial vehicle 110 causes the engagement capsule 166 to contact and engage with an underside of the power module 140-1 (not shown), thereby lifting the power module 140-1 from the chamber 125. Additionally, further elevation of the tension member 162 causes the power module 140-2 to enter and be installed within the chamber 125 from below. For example, the retractable latch 144-2 of the power module 140-2 may extend within the chamber 125 and retain the power module 140-2 therein with respect to gravitational forces that are encountered during flight operations. Once the power module 140-2 has been properly installed within the aerial vehicle 110, the releasable connector 168 may disengage from the power module 140-2. As is shown in FIG. 1G, after the power module 140-1 has been removed from the aerial vehicle 110, and the power module 140-2 has been installed therein, the aerial vehicle 110 may depart therefrom, and resume or commence one or more flight operations. Thereafter, the power module 140-1 may be recharged, and the power module 140-1 (or another power module) may be joined to the releasable connector 168 and made available for installation in an aerial vehicle in flight.

Accordingly, the systems and methods of the present disclosure may be directed to replacing power modules provided aboard aerial vehicles that are engaged in flight operations and not grounded. In some embodiments, aerial vehicles may include open chambers or cavities for receiving power modules therein, which such chambers being accessible from above or below such aerial vehicles. The chambers may have one or more walls or other lateral surfaces for engaging with or disengaging from the power modules, and such walls or surfaces may include one or more portions or aspects such as latches, hinges, detents or other joining components for mating with the power modules, which may further include one or more openings, crevices, notches or slats for accommodating one of such latches, hinges, detents or other joining components. Alternatively, the power modules may include one or more latches, hinges, detents or other joining components for mating with one or more walls or surfaces of the chambers, which may further include one or more openings, crevices, notches or slats for accommodating one of such latches, hinges, detents or other joining components.

The power modules of the present disclosure may be or include one or more batteries or other power cells for providing power at any voltage, and in series or in parallel, to one or more electrical circuits aboard an aerial vehicle. In some embodiments, the power modules may be any type, size or form of dry cell or wet cell battery having positive and negative cells and corresponding terminals or electrodes. For example, the battery may be a lead-acid battery, a lithium ion battery, a nickel cadmium battery or a nickel metal hydride battery, or any other type, size or form of battery. In some other embodiments, the power modules themselves may include other power modules therein, including but not limited to one or more replaceable batteries or other power cells (e.g., AAA, AA, C or D batteries), which may also be lead-acid batteries, lithium ion batteries, nickel cadmium batteries, nickel metal hydride batteries, or any other type, size or form of batteries. The power modules of the present disclosure may feature any suitable cell voltages, peak load currents, charge times, specific energies, internal resistances or cycle lives. Alternatively, the power modules may include any type, size or form of power source, including but not limited to or more fuel cells, turbines, solar cells or nuclear reactors.

The aerial vehicles of the present disclosure may include any number of replaceable power modules. Such modules may be installed in any position or location onboard the aerial vehicle, such as at the center of mass of the aerial vehicle, or along one or more centerlines or axes of rotation, in order to minimize any imbalance or disruptions that may result when such modules are removed from the aerial vehicles or installed therein. Alternatively, the power modules may be installed in other, eccentric locations aboard an aerial vehicle. For example, in some embodiments, two chambers for receiving power modules therein may be provided on either side of a centerline of an aerial vehicle, equidistant from the centerline. In some other embodiments, a chamber for receiving a power module therein may be provided at a distance from a centerline of an aerial vehicle, and one or more counterweights may be provided in other locations, in order to account for the additional mass of the power module.

Aerial vehicles having replaceable power modules installed therein may be configured to engage with a ground-based or airborne transfer station in any manner. For example, an aerial vehicle, such as the aerial vehicle 110 of FIGS. 1A and 1C through 1G, may include a slot or other opening through which a tension member may be extended in order to access a chamber having a power module that requires replacement, or to install a power module therein. Such a slot may extend from an exterior edge or surface of a frame of an aerial vehicle laterally inward toward one or more chambers of the aerial vehicle, and may be sized to accommodate a tension member or other extension of a transfer station. In some embodiments, the power modules of the present disclosure may also include slots extending laterally between external surfaces of the modules and internal openings of such modules.

In order to enable the transfer station to install a power module in a chamber within an aerial vehicle, or remove a power module from the chamber of the aerial vehicle, the aerial vehicle may operate to guide a tension member into the chamber via one or more lateral slots within the aerial vehicle and/or one or more power modules, e.g., by initiating relative lateral motion with respect to the tension member. For example, the aerial vehicle may travel at a substantially constant altitude and slow speed in a toward the tension member, with the tension member aligned with the slot. Alternatively, the aerial vehicle may hover, and the tension member may be automatically guided into the slot. Thereafter, a power module may be removed from a chamber, such as by engaging the power module with a tension member and initiating relative vertical motion between the tension member and the aerial vehicle, e.g., by raising or lowering the tension member with respect to the aerial vehicle, or by causing the aerial vehicle to ascend or descend with respect to the tension member. A power module disposed on the tension member may also be installed within the chamber by initiating relative vertical motion between the tension member and the aerial vehicle, and disengaging the tension module from the power module. Once the power module has been removed from the aerial vehicle and/or after a power module has been installed therein, the aerial vehicle may operate to guide the tension member out of the slot, or the tension member may be automatically withdrawn therefrom, e.g., by initiating relative lateral motion with respect to the tension member.

Power modules may be installed into or removed from aerial vehicles by one or more transfer stations, which may be ground-based or airborne. For example, a transfer station including a tension member and one or more replacement power modules may be mounted to any type, size or form of ground-based structures, including but not limited to general purpose structures such as utility poles, buildings, trees, or water towers, or to structures that are specifically provided for the purpose of removing or replacing power modules aboard aerial vehicles, including but not limited to the transfer station 150 of FIG. 1B. Alternatively, a transfer station may be maintained aloft by one or more aircraft including but not limited to airplanes, helicopters, balloons, dirigibles or any other aerial vehicles. In some embodiments, a power module may be replaced by or exchanged between two or more aerial vehicles of a common class. For example, where an aerial vehicle having a power module with a substantially low level of power or charge is tasked with a mission of an extended duration, and an aerial vehicle having a power module with a substantially high level of power or charge is tasked with a mission of a brief duration, the aerial vehicles may effectively trade or swap power modules, either directly from one aerial vehicle to another, or by way of a transfer station as an intermediary.

Figure 2:
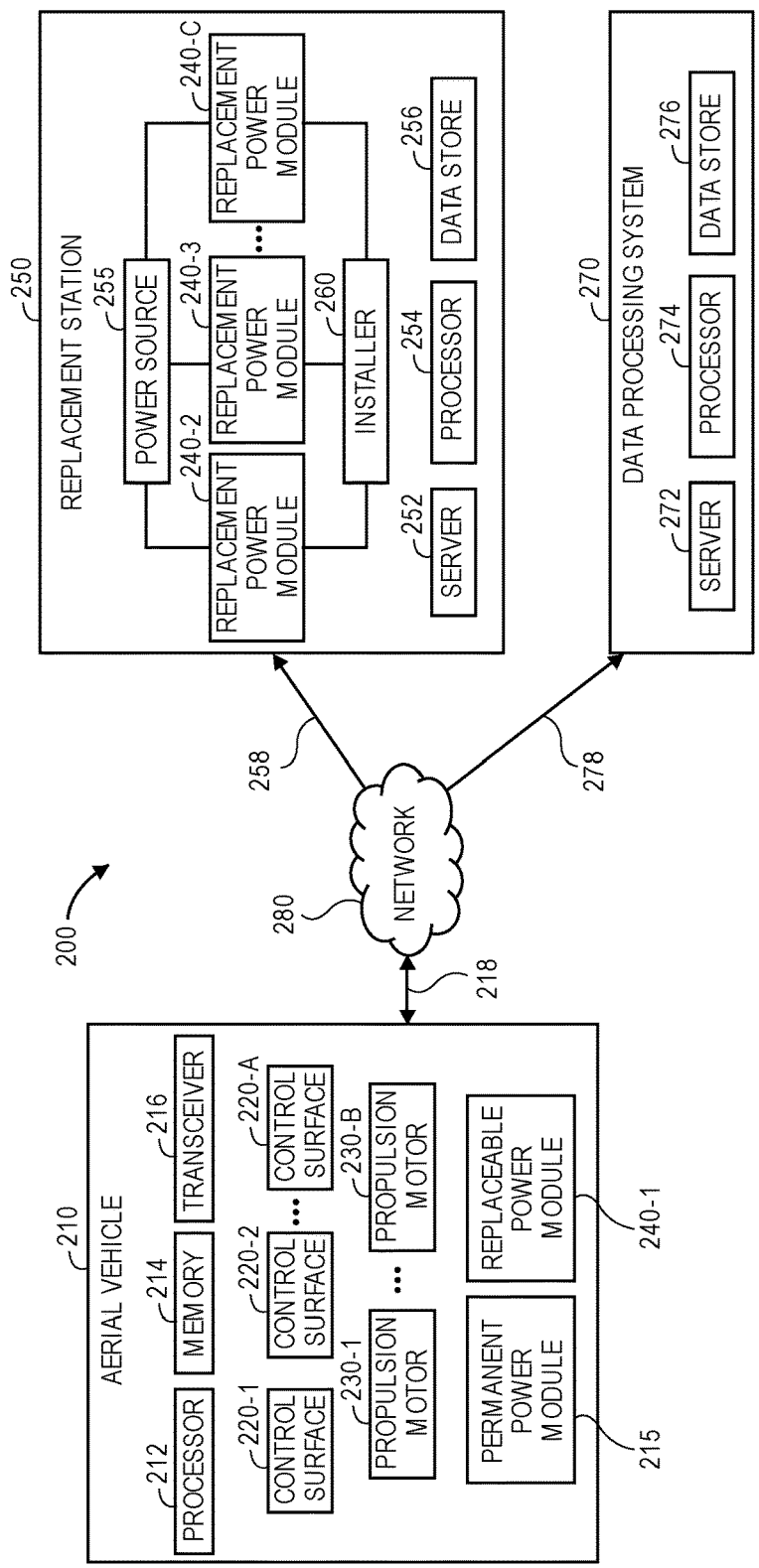
FIG. 2 is a block diagram of one system including an aerial vehicle having a replaceable power module in accordance with embodiments of the present disclosure.

Referring to FIG. 2, a block diagram of components of one system 200 including an aerial vehicle having a replaceable power module in accordance with embodiments of the present disclosure is shown. The system 200 of FIG. 2 includes an aerial vehicle 210, a replacement station (or transfer station) 250 and a data processing system 270 connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1G.

The aerial vehicle 210 includes a processor 212, a memory 214 and a transceiver 216, a plurality of control surfaces 220-1, 220-2 . . . 220-$a$, a plurality of propulsion motors 230-1 . . . 230-$b$, a permanent power module 215 and a replaceable power module 240-1.

The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the control surfaces 220-1, 220-2 . . . 220-$a$, the propulsion motors 230-1 . . . 230-$b$. The processor 212 may also execute one or more monitoring functions regarding a status or a capacity of the permanent power module 215 and/or the replaceable power module 240-1. For example, the processor 212 may control the operation of one or more control systems or modules (not shown) for generating instructions for operating components of the aerial vehicle 210, e.g., for operating one or more of the control surfaces 220-1, 220-2 . . . 220-$a$ or the propulsion motors 230-1 . . . 230-$b$, or any other aspect of the aerial vehicle 210, including but not limited to lights or payload manipulation equipment provided thereon (not shown). Such control systems or modules may be associated with the processor 212 and/or with one or more other computing devices or machines (not shown) over the network 280, and may communicate with the replacement station 250, the data processing system 270 or the one or more other computer devices or machines (not shown) over the network 280, as indicated by line 218, through the sending and receiving of digital data. The aerial vehicle 210 further includes one or more memory or storage components 214 (such as databases or data stores) for storing any type of information or data, e.g., instructions for operating the aerial vehicle 210, or information or data captured during operations of the aerial vehicle 210.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

The processor 212 may be provided as a portion of one or more other systems such as electronic speed controls, power supplies, navigation systems and/or payload engagement controllers for engaging with or releasing items, as desired, or configured to operate such systems. For example, the processor 212 may be configured to cause or control the operation of one or more of the control surfaces 220-1, 220-2 . . . 220-a or the propulsion motors 230-1 . . . 230-b, such as by repositioning one or more of such control surfaces 220-1, 220-2 . . . 220-a to within a desired range, or to cause one or more of the propulsion motors 230-1 . . . 230-b to operate at a desired speed, in order to guide the aerial vehicle 210 along a determined or desired flight path, or by operating one or more lights, payload manipulation equipment, or any other component provided thereon.

Additionally, the memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or incorporated directly into the processor 212.

The control surfaces 220-1, 220-2 . . . 220-a may be any sections or appurtenances provided on the aerial vehicle 210 that may be manipulated in order to dynamically modify a position or orientation of the aerial vehicle 210 with respect to one or more degrees of freedom. For example, the control surfaces 220-1, 220-2 . . . 220-a may include, but are not limited to, wings, rudders, ailerons, elevators, flaps, brakes or slats, or other features. The aerial vehicle 210 may include any number of such control surfaces 220-1, 220-2 . . . 220-a of any kind.

The propulsion motors 230-1 . . . 230-b may be any type or form of motor (e.g., electric, gasoline-powered or any other type of motor) capable of generating sufficient rotational speeds of one or more propellers or other components to provide lift and/or thrust forces to the aerial vehicle 210 and any engaged payload, or to aerially transport the engaged payload thereby. For example, one or more of the propulsion motors 230-1 . . . 230-b may be a brushless direct current (DC) motor such as an outrunner brushless motor or an inrunner brushless motor. The aerial vehicle 210 may include any number of such propulsion motors 230-1 . . . 230-b of any kind. For example, one or more of the propulsion motors 230-1 . . . 230-b may be aligned or configured to provide forces of lift to the aerial vehicle 210, exclusively, while one or more of the propulsion motors 230-1 . . . 230-b may be aligned or configured to provide forces of thrust to the aerial vehicle 210, exclusively. Alternatively, one or more of the propulsion motors 230-1 . . . 230-b may be aligned or configured to provide forces of lift and forces of thrust to the aerial vehicle 210, as needed. For example, the propulsion motors 230-1 . . . 230-b may be fixed in their orientation on the aerial vehicle 210, or configured to vary their respective orientations, e.g., a tilt-rotor aircraft. Moreover, the propulsion motors 230-1 . . . 230-b may be aligned or configured to operate with different capacities or ratings, or at different speeds, or coupled to propellers having different sizes and shapes.

In addition to the control surfaces 220-1, 220-2 . . . 220-a and the propulsion motors 230-1 . . . 230-b, the aerial vehicle 210 may further include one or more imaging devices (e.g., digital cameras, depth sensors or range cameras, infrared cameras, radiographic cameras or other optical sensors) or any number of other sensors, components or other features for controlling or aiding in the operation of the aerial vehicle 210 (not shown), including but not limited to one or more environmental or operational sensors for determining one or more attributes of an environment in which the aerial vehicle 210 is operating, or may be expected to operate. Some such sensors may include Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

As is also shown in FIG. 2, the aerial vehicle 210 includes a permanent power module 215 and a replaceable power module 240-1. Each of the permanent power module 215 and the replaceable power module 240-1 may be any type of power source for providing power at a desired voltage in order to energize one or more electrical loads circuits aboard the aerial vehicle 210. One or more of the permanent power module 215 or the replaceable power module 240-1 may include one or more batteries or other power cells, e.g., dry cell or wet cell batteries such as lead-acid batteries, lithium ion batteries, nickel cadmium batteries or nickel metal hydride batteries, or any other type, size or form of batteries. The permanent power module 215 or the replaceable power module 240-1 may each have any cell voltages, peak load currents, charge times, specific energies, internal resistances or cycle lives, or other power ratings. Alternatively, the permanent power module 215 or the replaceable power module 240-1 may be any type, size or form of other power source, e.g., other than a battery, including but not limited to or more fuel cells, turbines, solar cells or nuclear reactors.

In some embodiments, the permanent power module 215 may have a limited voltage or power capacity, and may be provided for the purpose of powering any of the control surfaces 220-1, 220-2 . . . 220-a, the propulsion motors 230-1 . . . 230-b, or other electronic components aboard the aerial vehicle 210 on a short-term basis, or at limited voltages or power levels. In some embodiments, the replaceable power module 240-1 may have an extended voltage or power capacity, and may be provided for the purpose of powering each of the control surfaces 220-1, 220-2 . . . 220-a, the propulsion motors 230-1 . . . 230-b, or any other electronic components, at any available safe operating level or capacity. In some other embodiments, the permanent power module 215 and the replaceable power module 240-1 may have similar or identical voltage or power capacities. The aerial vehicle 210 may include any number of electrical contacts or terminals that are aligned to make mating contact with corresponding contacts or terminals on the replaceable power module 240-1, or on any of the replacement power modules 240-2, 240-3 . . . 240-c. Upon being placed into mating contact with such contacts or terminals, the replaceable power module 240-1 or one of the replacement power modules 240-2, 240-3 . . . 240-c may power any of the electrical loads of the aerial vehicle 210 accordingly.

With regard to the replaceable power module 240-1, the term "replaceable" or "replacement" implies that the replaceable power module 240-1 or the replacement power modules 240-2, 240-3 . . . 240-c may be removed from the aerial vehicle 210 or installed therein while the aerial vehicle 210 is in flight. With regard to the permanent power module 215, the term "permanent" implies that the permanent power module 215 may not be removed from the aerial vehicle 210 in flight. Moreover, the aerial vehicle 210 need not include a permanent power module 215, and may instead be configured with two or more replaceable power modules 240-1, such that when one or more of the replaceable power modules 240-1 is removed from the aerial vehicle 210, any remaining replaceable power modules 240-1 may provide power to electrical loads or circuits aboard the aerial vehicle 210 until one of the replacement power modules 240-2, 240-3 . . . 240-c is installed therein.

The replacement station 250 may be any stationary or mobile system for installing power modules into or removing power modules from aerial vehicles. As is shown in FIG. 2, the replacement station 250 includes one or more physical computer servers 252 having one or more computer processors 254 and a plurality of data stores 256 associated therewith, and may be provided for any specific or general purpose. The replacement station 250 also includes a plurality of replacement power modules 240-2, 240-3 . . . 240-c, a power source 255 and an installer 260. The servers 252 may be connected to or otherwise communicate with the processors 254 and the data stores 256. Additionally, the data stores 256 may store any type of information or data, including but not limited to available power capacities, remaining charge times, operating histories or any other relevant data regarding any of the replacement power modules 240-2, 240-3 . . . 240-c, or of power modules provided aboard aerial vehicles, e.g., the replaceable power module 240-1 aboard the aerial vehicle 210, for any purpose. The servers 252 and/or the computer processors 254 may also connect to or otherwise communicate with the network 280, as indicated by line 258, through the sending and receiving of digital data.

In some embodiments, the replacement station 250 may be provided in a ground-based location. In other such embodiments, the replacement station 250 may be mobile, e.g., installed aboard any type of mobile land, sea or air-based vehicle such as an automobile, a boat or a dirigible. One or more of the computer devices associated with the replacement station 250, including but not limited to the servers 252, the processors 254 and/or the data stores 256, may be provided in one or more alternate or virtual locations, e.g., in a "cloud"-based environment. In still other embodiments, the replacement station 250 may be provided onboard one or more aerial vehicles, including but not limited to the aerial vehicle 210. Furthermore, the power source 255 may be used to provide power to one or more components associated with the replacement station 250, including but not limited to the server 252, the processors 254, the data stored 256 or the installer 260. In particular, the power source 255 may be used to maintain the replacement power modules 240-2, 240-3 . . . 240-c in fully or nearly fully charged conditions, or to recharge the replaceable power module 240-1 after the replacement power module 240-1 has been removed from the aerial vehicle 210.

The installer 260 may be any mechanism for engaging with a power module and an aerial vehicle in order to install the power module into a chamber or cavity of the aerial vehicle, or to remove the power module therefrom. The installer 260 may include any number of tension members, engagement devices or releasable connectors for coupling with, repositioning or releasing power modules, such as the replaceable power module 240-1 or any of the replacement modules 240-2, 240-3 . . . 240-c. For example, referring again to FIG. 2, the installer 260 may include any number of the tension members 162, winches 164, engagement capsules 166 or releasable connectors 168, or like components, shown therein.

The replacement power modules 240-2, 240-3 . . . 240-c may be power modules configured for installation into the aerial vehicle 210, in lieu of the replaceable power module 240-1. The replacement power modules 240-2, 240-3 . . . 240-c may have physical properties that are substantially identical to the physical properties of the replaceable power module 240-1, e.g., dimensions and/or cross-sections, and may have power ratings (e.g., voltage and/or current) that are substantially identical to those of the replacement power modules 240-2, 240-3 . . . 240-c may, or may be markedly different from those of the replaceable power module 240-1. For example, one of the replacement power modules 240-2, 240-3 . . . 240-c may have a longer battery life or greater peak current than the battery life or peak current of the replaceable power module 240-1. Thus, where the aerial vehicle 210 is expected to conduct a mission having an extended duration or increased operational requirements, the replaceable power module 240-1 may be replaced with the one of the replacement power modules 240-2, 240-3 . . . 240-c having the longer battery life or the greater peak current.

The data processing system 270 includes one or more physical computer servers 272 having one or more computer processors 274 as well as a plurality of data stores 276 associated therewith, and may be provided for any specific or general purpose. For example, the data processing system 270 of FIG. 2 may be independently provided for the exclusive purpose of receiving, analyzing or storing information or data received from the aerial vehicle 210 or, alternatively, provided in connection with one or more physical or virtual services configured to receive, analyze or store such information or data, as well as one or more other functions. The servers 272 may be connected to or otherwise communicate with the processors 274 and the data stores 276, which may store any type of information or data, e.g., information or data regarding environmental conditions, operational characteristics, or positions, for any purpose. The servers 272 and/or the computer processors 274 may also connect to or otherwise communicate with the network 280, as indicated by line 278, through the sending and receiving of digital data. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the replacement station 250 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the replacement station 250 and/or the data processing system 270 or to any other computer device (e.g., to one or more other aerial vehicles) in real time or in near-real time, or in one or more offline processes, via the network 280. Those of ordinary skill in the pertinent art would recognize that the aerial vehicle 210, the replacement station 250 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the processors 254 or the processors 274, or any other computers or control systems utilized by the aerial vehicle 210, the replacement station 250 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but are not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
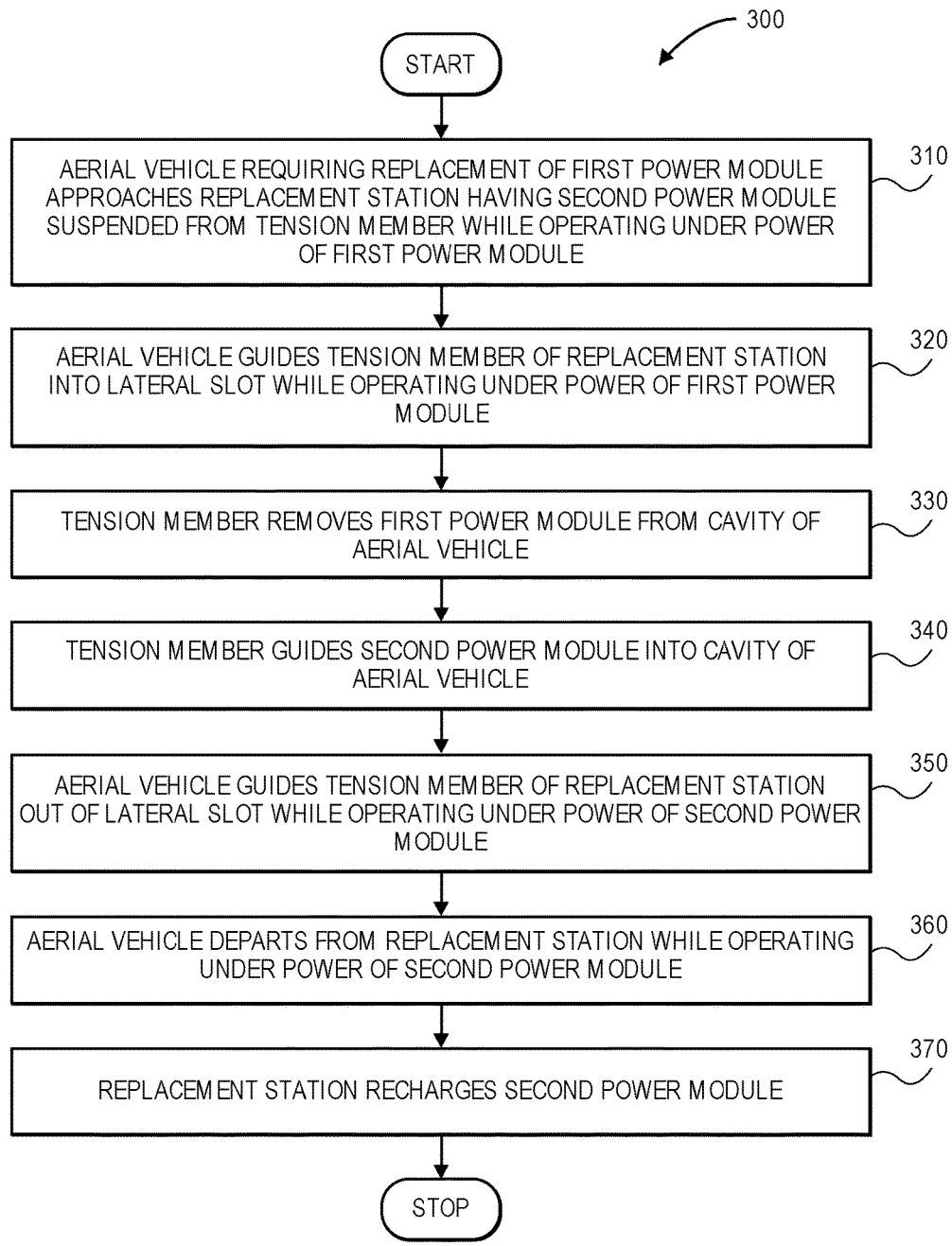
FIG. 3 is a flow chart of one process for replacing an aerial vehicle power module in accordance with embodiments of the present disclosure.

As is discussed above, in accordance with embodiments of the present disclosure, power modules may be removed from aerial vehicles in flight, or installed into aerial vehicles in flight. Referring to FIG. 3, a flow chart 300 of one process for replacing an aerial vehicle power module in accordance with embodiments of the present disclosure is shown. At box 310, an aerial vehicle having a first power module that requires replacement approaches a replacement station having a second power module that is suspended from a tension member while operating under the power of the first power module. For example, the aerial vehicle may read and interpret a level of charge, voltage or output current of electric power from the first power module, or track an elapsed time that the first power module has been operating or since the first power module was last charged. The aerial vehicle may independently determine that the first power module requires replacement, or may receive an instruction to replace the first power module from one or more extrinsic computer systems, e.g., the replacement station.

At box 320, the aerial vehicle guides the tension member of the replacement station into a lateral slot, under the power of the first power module. For example, referring again to FIG. 1C, the aerial vehicle may align a lateral slot or other opening leading from an external rim or surface of an airframe or other component of the aerial vehicle to a cavity (or chamber) accommodating the first power module, and may guide the tension member toward the cavity through the lateral slot, e.g. by operating at a substantially constant altitude and slow speed until the tension member reaches the cavity via the lateral slot.

At box 330, the tension member removes the first power module from the cavity of the aerial vehicle, e.g., by establishing relative motion between the tension member and the aerial vehicle. For example, the first power module may also include a slot aligned with the lateral slot of the aerial vehicle. After the tension member reaches the cavity via the lateral slot the tension member may enter a central region of the first power module, and lift the first power module from the aerial vehicle accordingly, e.g., by an engagement device or capsule, or like component, coupled to the tension member. In some embodiments, an engagement device or capsule may have one or more external surfaces that correspond to one or more internal surfaces of the first power module, such that the engagement device or capsule contacts with the first power module and lifts the first power module from the cavity upon being raised therefrom, thereby breaking any contact between electrical contacts or terminals of the first power module and corresponding contacts or terminals of one or more electrical circuits provided onboard the aerial vehicle.

At box 340, the tension member guides a second power module into the cavity of the aerial vehicle that was vacated by the removal of the first power module therefrom. For example, referring again to FIGS. 1E and 1F, raising the tension member 162 first causes the engagement capsule 166 to lift the power module 140-1 from the chamber 125 of the aerial vehicle 110 and, next, causes the power module 140-2 to be guided into the chamber 125. Alternatively, the tension member may remain fixed in position, and the aerial vehicle may change in elevation, as necessary, to remove the first power module and to install the second power module. Subsequently, the electrical contacts or terminals of the second power module are placed into mating contact between the corresponding contacts or terminals of one or more electrical loads or circuits provided onboard the aerial vehicle, and such loads or circuits may be powered by the second power module accordingly. During a period when the first power module has been removed from the aerial vehicle, and the second power module has not yet been installed into the aerial vehicle, electrical loads or circuits that were being powered by the first power module may be powered from an alternate source, e.g., a permanent power module, or temporarily suspended until the second power module is available and aligned to energize such loads or circuits.

At box 350, the aerial vehicle guides the tension member of the replacement station out of the lateral slot. For example, the aerial vehicle may operate at a substantially constant altitude and a slow speed in an opposite direction, until the tension member has cleared the lateral slot, or no longer poses a risk of collision with any of motors, propellers or other appurtenances or components of the aerial vehicle accordingly. At box 360, the aerial vehicle departs from the replacement station while operating under the power of the second power module. At box 370, the replacement station recharges the second power module, e.g., thereby enabling the second power module to be installed in another aerial vehicle, and the process ends.

Interaction between an installer when installing or removing replacement power modules into an aerial vehicle are shown in FIGS. 4A through 4F. Referring to FIG. 4A through 4F, views of aspects of one system 400 including an aerial vehicle 410 having a replaceable power module in accordance with embodiments of the present disclosure are shown. Except where otherwise noted, reference numerals preceded by the number "4" shown in FIGS. 4A through 4F indicate components or features that are similar to components or features having reference numerals preceded by the number "2" shown in FIG. 2 or by the number "1" shown in FIGS. 1A through 1G.

Figure 4A:
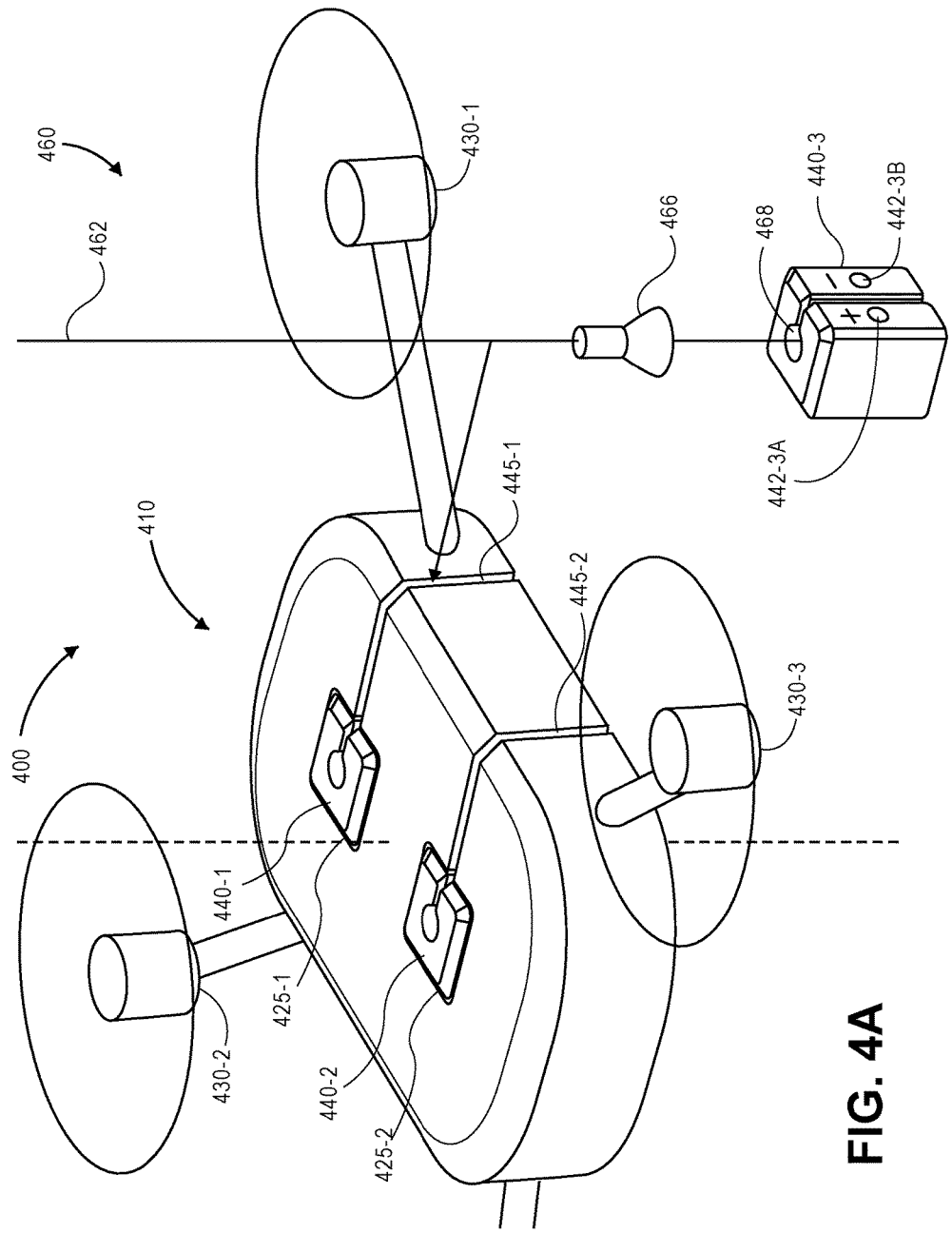
FIGS. 4A through 4F are views of aspects of one system including an aerial vehicle having a replaceable power module in accordance with embodiments of the present disclosure.

As is shown in FIG. 4A, the system 400 includes an aerial vehicle 410 and an installer system 460. The aerial vehicle 410 includes a pair of open chambers (or cavities) 425-1, 425-2, each having a power module 440-1, 440-2 installed therein and a slot 445-1, 445-2 extending laterally between an external surface or perimeter of the aerial vehicle 410 and a corresponding one of the chambers 425-1, 425-2. The aerial vehicle 410 further includes a plurality of motors 430-1, 430-2, 430-3. The installer system 460 includes a tension member 462, an engagement capsule 466 and a releasable connector 468 having a power module 440-3 releasably joined thereto. The installer system 460 may be mounted to a ground-based structure or onboard a land, sea or air vehicle (not shown). The power module 440-3 includes a pair of electrical terminals (or contacts) 442-3A, 442-3B, e.g., a cathode and an anode. The releasable connector 468 may be any device for engaging and disengaging the power module 440-3, including a mechanical plug or stopper, an electromechanical contact, or any other releasable connector.

Figure 4B:
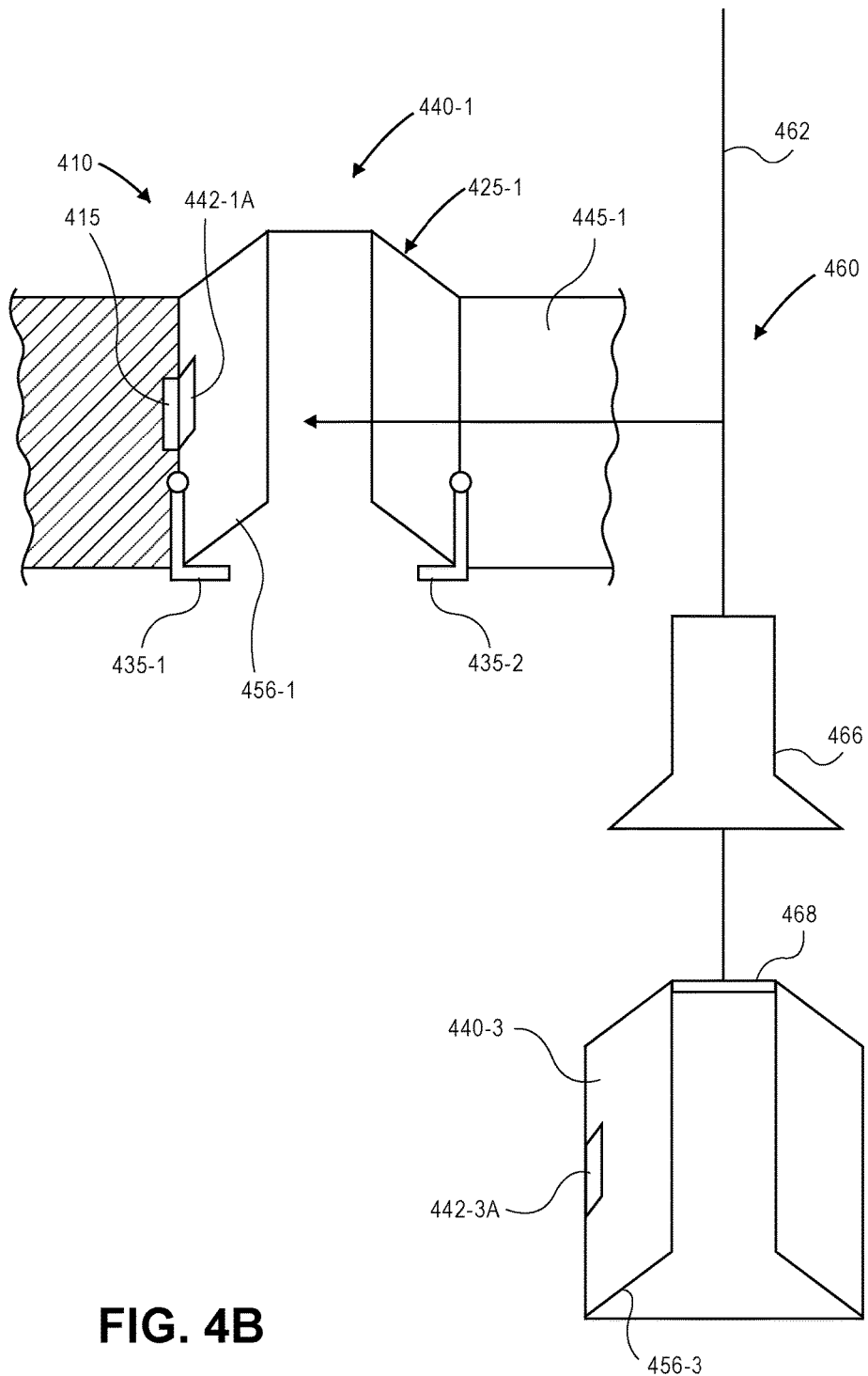
Figure 4C:
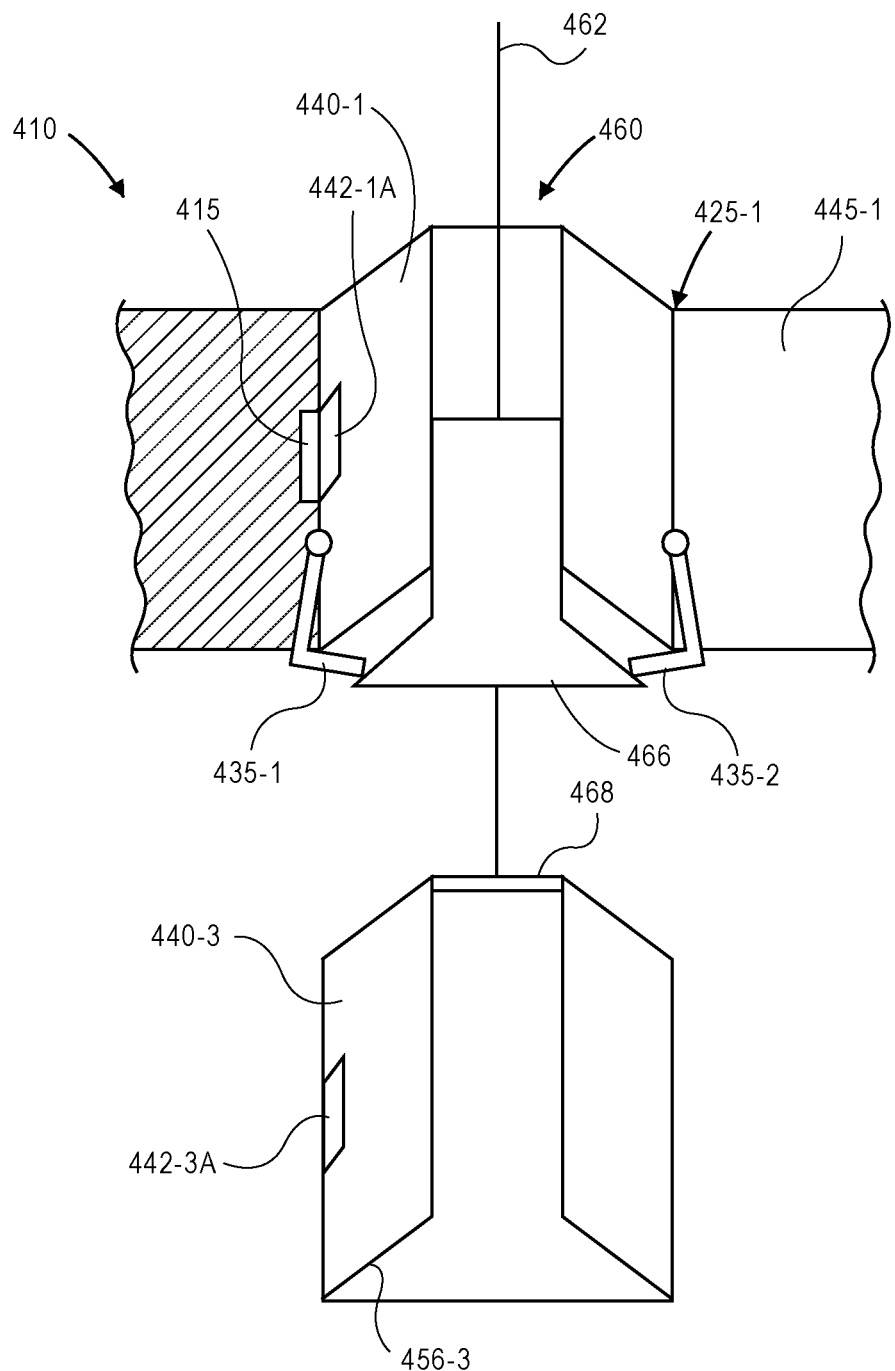

As is shown in FIG. 4B, the tension member 462 may pass through the slot 445-1 and enter the chamber 425-1 of the aerial vehicle 410. Inserting the tension member 462 into the chamber 425-1 causes the engagement capsule 466 to be positioned below the chamber 425-1, which includes a pair of spring-loaded retainers or latches 435-1, 435-2 for maintaining vertical support for the power module 440-1 within the chamber 425-1. As is shown in FIG. 4C, raising the tension member 462 causes the engagement capsule 466 to open the retainers 435-1, 435-2, and engage with the power module 440-1 within the chamber 425-1. Because the engagement capsule 466 includes an upper end having a width that is narrower than a width of a space between the ends of the retainers 435-1, 435-2, the engagement capsule 466 will initially pass through the space between the ends of the retainers 435-1, 435-2. Likewise, because the engagement capsule 466 has a sloped (e.g., conic, or other tapered shape) lower surface that gradually widens beyond the width of the space between the ends of the retainers 435-1, 435-2, the retainers 435-1, 435-2 will begin to open upon coming into contact with the sloped lower surface of the engagement capsule 466.

Figure 4D:
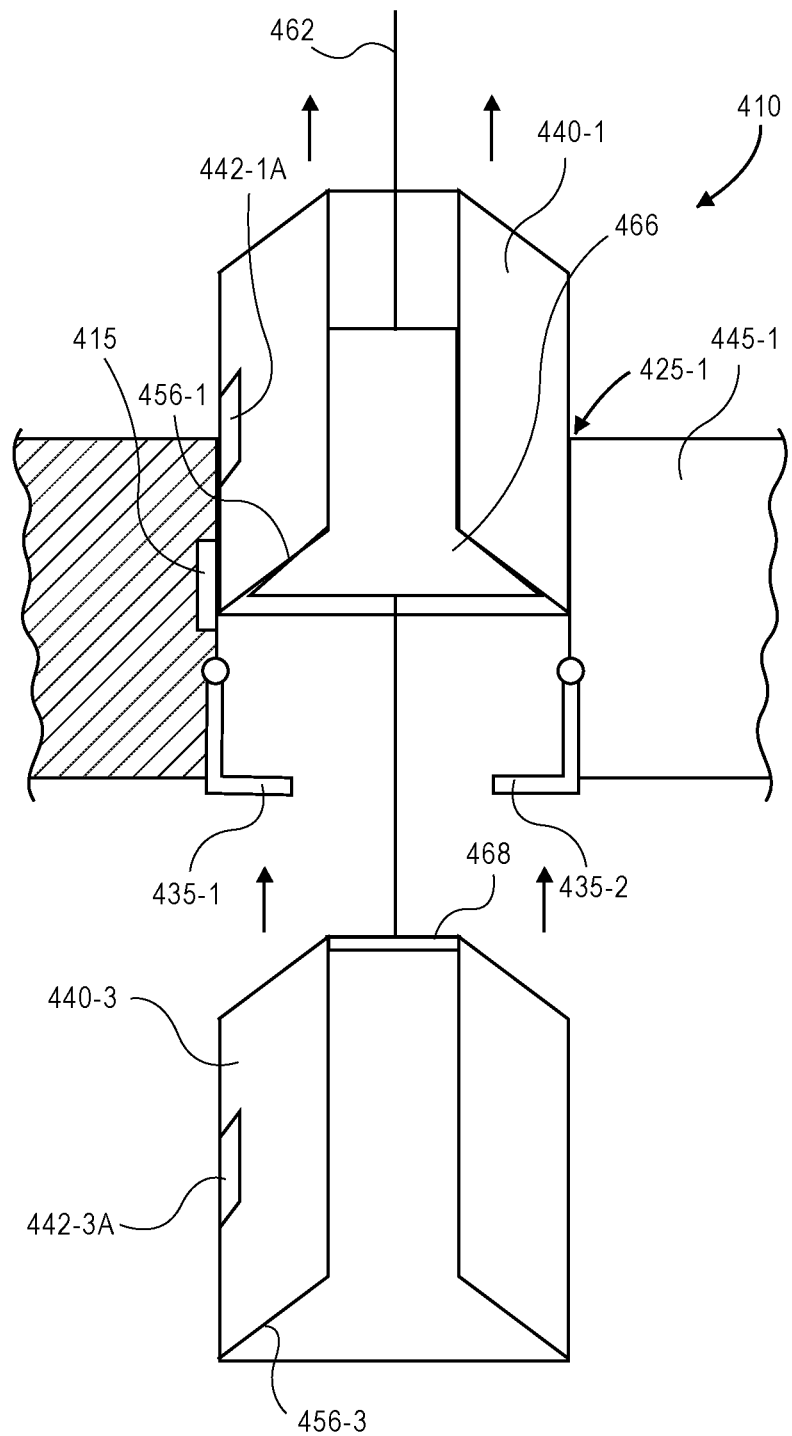

As is shown in FIG. 4D, a shape of the sloped lower surface of the engagement capsule 466 corresponds to and is configured to mate with a sloped (e.g., conic, or other tapered shape) surface 456-1 of an underside of the power module 440-1. Thus, once the engagement capsule 466 has engaged with the internal opening of the power module 440-1, continued lifting of the tension member 462 causes the power module 440-1 to begin to lift from the chamber 425-1, thus exposing contacts between terminals of the power module 440-1 (one of which, terminal 442-1A, is shown in FIGS. 4B through 4F) and contacts 415 of one or more electrical circuits onboard the aerial vehicle 410.

Figure 4E:
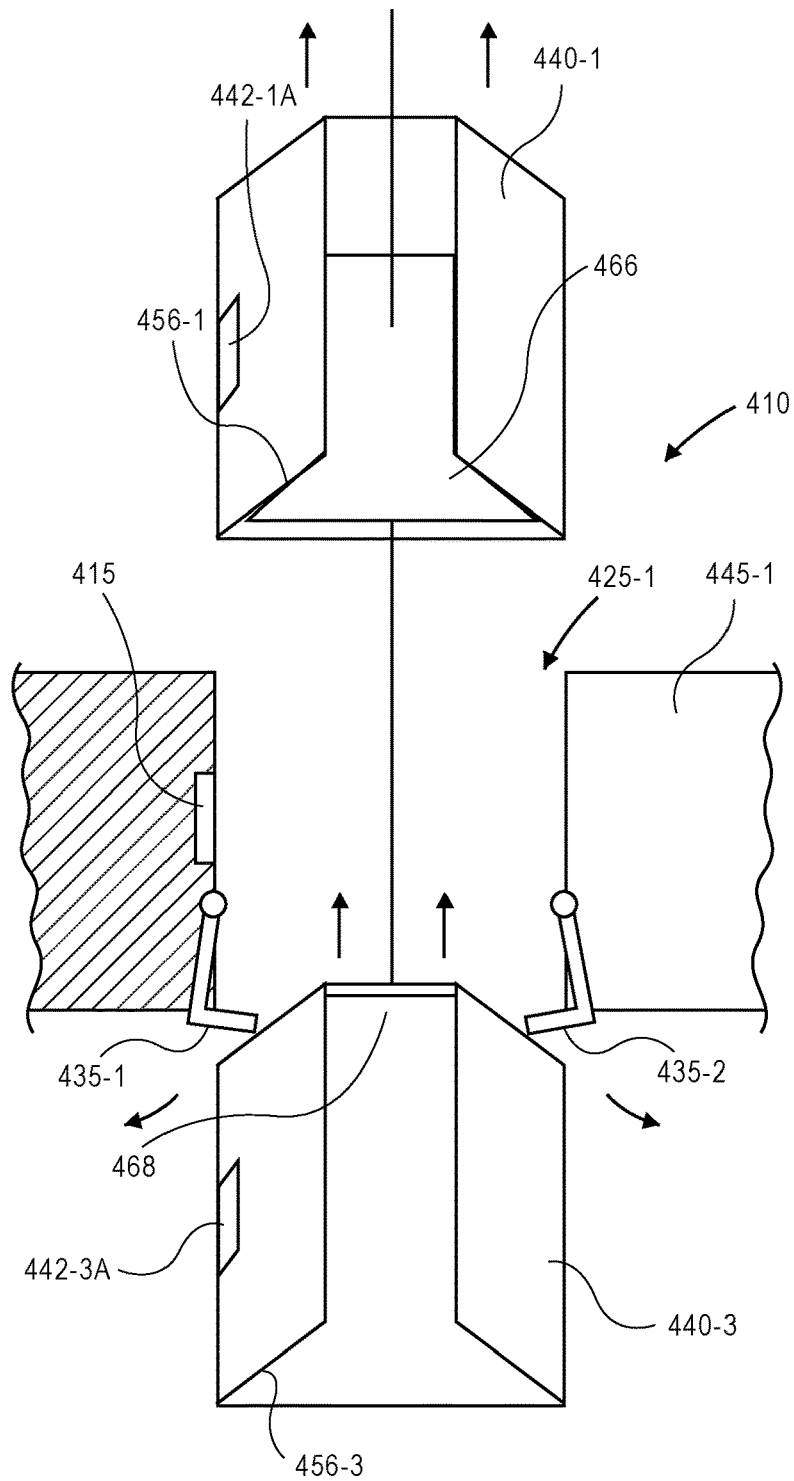
Figure 4F:
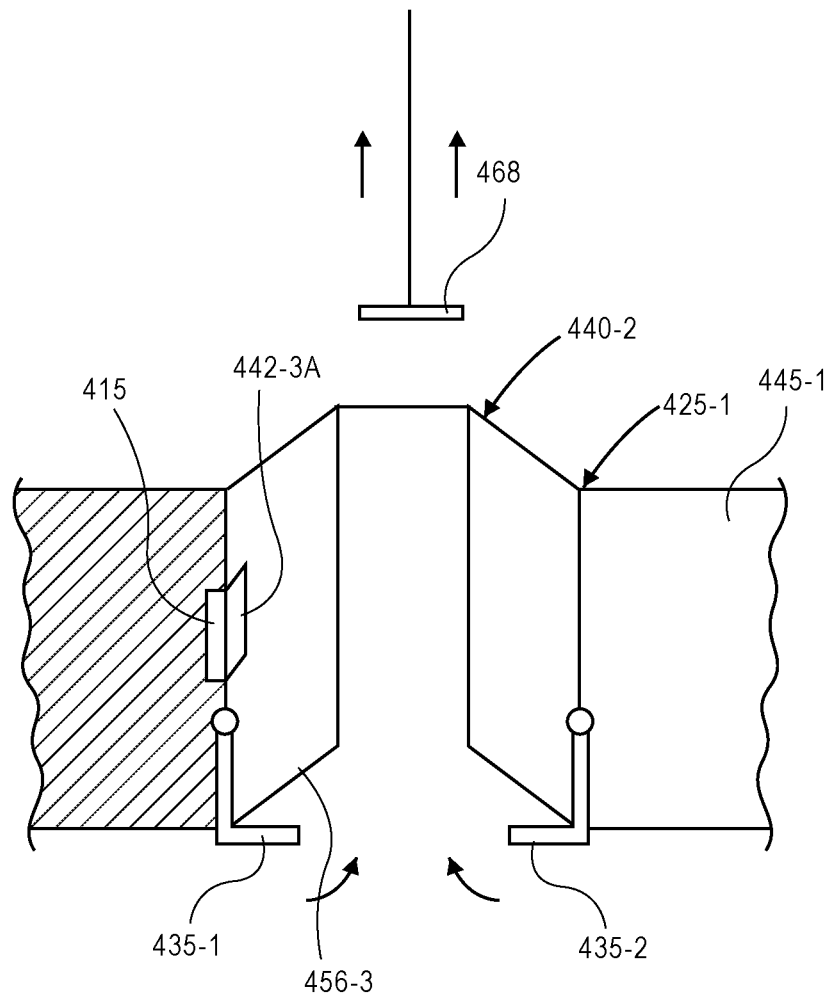

As is shown in FIG. 4E, after the power module 440-1 is removed from the chamber 425-1, a sloped (e.g., conic, or other tapered shape) upper surface of the power module 440-3 releasably joined to the releasable connector 468 comes into contact with and opens the retainers 435-1, 435-2, thereby enabling the power module 440-3 to begin to enter the chamber 425-1. As is shown in FIG. 4F, after the power module 440-3 has cleared the retainers 435-1, 435-2 and entered the chamber 425, electrical contact between the terminals of the power module 440-3 (one of which, terminal 442-3A, is shown in FIGS. 4B through 4F) and the contacts 415 of the electrical circuits onboard the aerial vehicle 410 are made. After the retainers 435-1, 435-2 have closed behind the power module 440-3, the releasable connector 468 uncouples from the power module 440-3, and the aerial vehicle 410 may conduct one or more operations under power of the power module 440-3.

Figure 5:
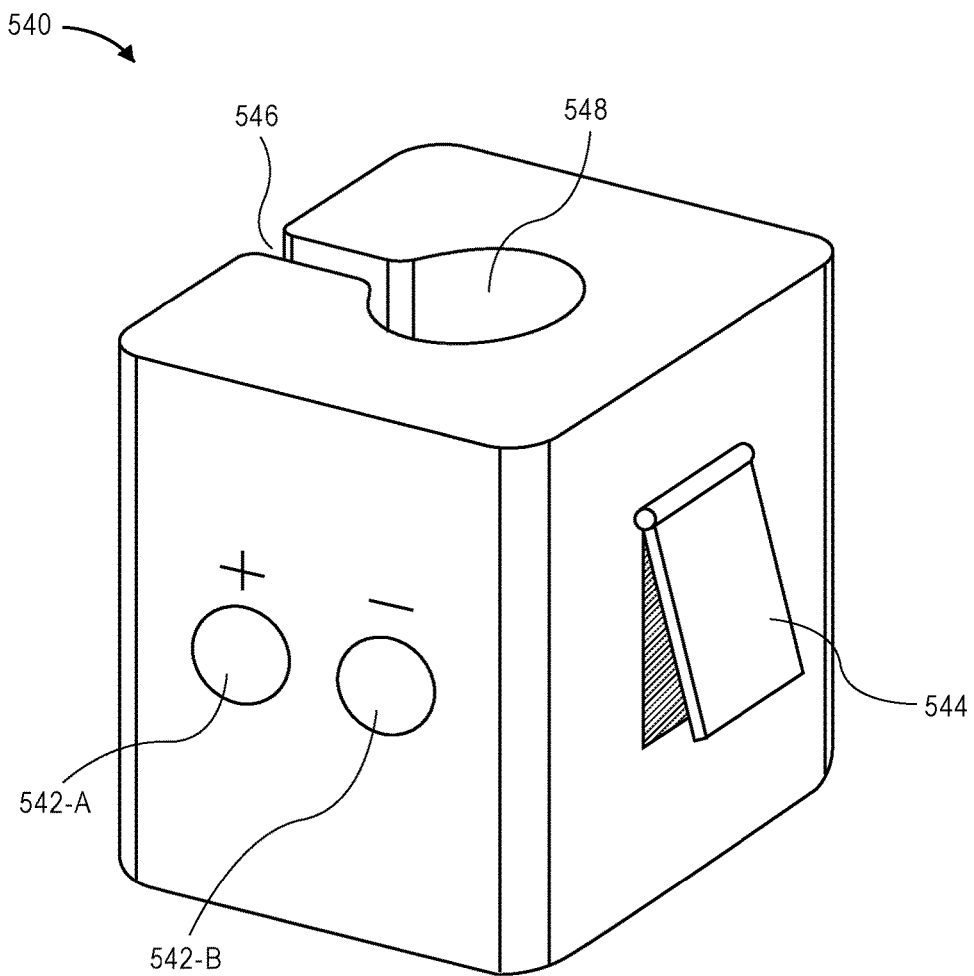
FIG. 5 is a view of one replaceable power module in accordance with embodiments of the present disclosure.

Referring to FIG. 5, a view of one replaceable power module 540 in accordance with embodiments of the present disclosure is shown. Except where otherwise noted, reference numerals preceded by the number "5" shown in FIG. 5 indicate components or features that are similar to components or features having reference numerals preceded by the number "4" shown in FIGS. 4A through 4F, by the number "2" shown in FIG. 2 or by the number "1" shown in FIGS. 1A through 1G.

As is shown in FIG. 5, the power module 540 has a substantially square cross section and includes a pair of electrical terminals 542-A, 542-B, a retractable latch 544, a slot 546 and a central opening 548. The electrical terminals 542-A, 542-B (e.g., a cathode and an anode) are provided on one face of the power module 540 for making mating contact with corresponding contacts or terminals of electrical circuits aboard an aerial vehicle (not shown), and powering the circuits from the power module 540 accordingly. The retractable latch 544 may be spring-biased open and configured to extend when the power module 540 has been releasably inserted into a chamber or cavity of the aerial vehicle, thereby supporting the power module 540 within the aerial vehicle against forces acting on the power module 540 due to gravity. In some embodiments, a chamber or cavity may include one or more inner surfaces having one or more openings, crevices, notches or slats for accommodating the retractable latch 544 when the power module 540 is releasably inserted into the chamber or cavity. The slot 546 is provided for alignment with a corresponding slot of an aerial vehicle, e.g., the slot 145 of the aerial vehicle 110 of FIG. 1A, such that a tension member of an installer system (not shown) passing through the corresponding slot of the aerial vehicle may enter the central opening 548, which is typically aligned with a center of gravity of the power module 540. Thus, the tension member may be used to lift an engagement device (e.g., a capsule) into the central opening 548, and to remove the power module 540 from the aerial vehicle accordingly.

Although the power module 540 of FIG. 5 includes a substantially square cross section, e.g., four sides of equal length provided at right angles with respect to one another, power modules of the present disclosure may have cross sections of any regular or irregular (e.g., eccentric) shape. For example, a cross section of a power module may have a substantially circular, oval, triangular, hexagonal, octagonal shape, or any other shape. In some embodiments, a cross section of a power module may be uniform along an entire height or length of the power module, such as the substantially square cross section of the power module 540 of FIG. 5. Moreover, in some embodiments, a power module may have a cross-sectional area that corresponds to a cross-sectional area of a chamber or cavity of an aerial vehicle in such a manner that the power module may be inserted into the chamber or cavity in only one orientation, i.e., such that an orientation of the chamber or cavity corresponds to an orientation of the power module.

Figure 6A:
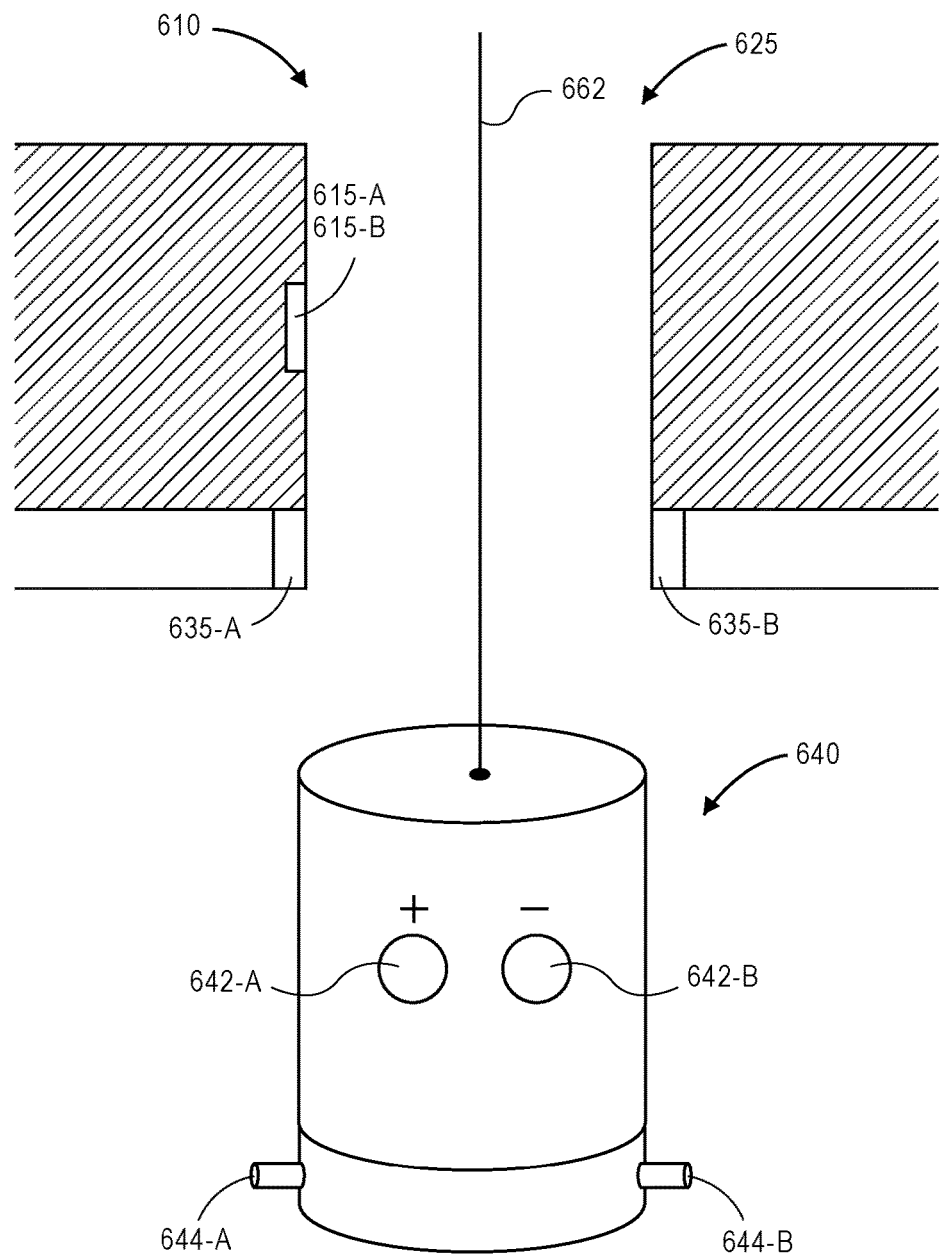

Aerial vehicles that are configured to receive power modules of the present disclosure may include one or components for automatically guiding such modules into appropriate positions within their respective chambers. Referring to FIGS. 6A through 6C, views of aspects of one system including an aerial vehicle having a replaceable power module in accordance with embodiments of the present disclosure are shown. Except where otherwise noted, reference numerals preceded by the number "6" shown in FIGS. 6A through 6C indicate components or features that are similar to components or features having reference numerals preceded by the number "5" shown in FIG. 5, by the number "4" shown in FIGS. 4A through 4F, by the number "2" shown in FIG. 2 or by the number "1" shown in FIGS. 1A through 1G.

As is shown in FIGS. 6A through 6C, a power module 640 having a pair of terminals 642-A, 642-B and a pair of radial extensions (pins, posts or other protrusions having cross sections of any shape or size) 644-A, 644-B is aligned for insertion into a chamber 625 of an aerial vehicle 610. A tension member 662 coupled to a releasable connector 668 extends through the chamber 625. An underside of the chamber 625 includes a pair of spiraling channels 635-1, 635-2 for receiving the respective radial extensions 644-A, 644-B. The chamber 625 has a circular cross section that corresponds to a circular cross section of the power module 640, and includes a pair of contacts 615-A, 615-B on one side of the chamber 625. The placement and alignment of the spiraling channels 635-1, 635-2 about an axis of the chamber 625, require that the power module 640 may be inserted into the chamber 625 in only one orientation, e.g., with the radial extensions 644-A, 644-B entering the spiraling channels 635-1, 635-2, which cause the power module 640 to physically rotate about the axis of the chamber 625 as the power module 640 is advanced into the chamber 625. Thus, the spiraling channels 635-1, 635-2 may guarantee that the terminals 642-A, 642-B of the power module 640 are aligned and come into contact with corresponding contacts 615-A, 615-B that are provided on the one side within the chamber 625 of the aerial vehicle 610, and are electrically coupled to one or more electrical loads or circuits of the aerial vehicle 610. Alternatively, in some embodiments, a chamber may be provided with one or more radial extensions, e.g., at a mouth of an opening of the chamber, extending radially into the mouth, and a power module may be provided with one or more channels for receiving the radial extensions therein, such that the power module may be caused to physically rotate about an axis of the chamber as the power module is inserted into the chamber, and as the extensions enter the channels.

Figures 7A, 7B:
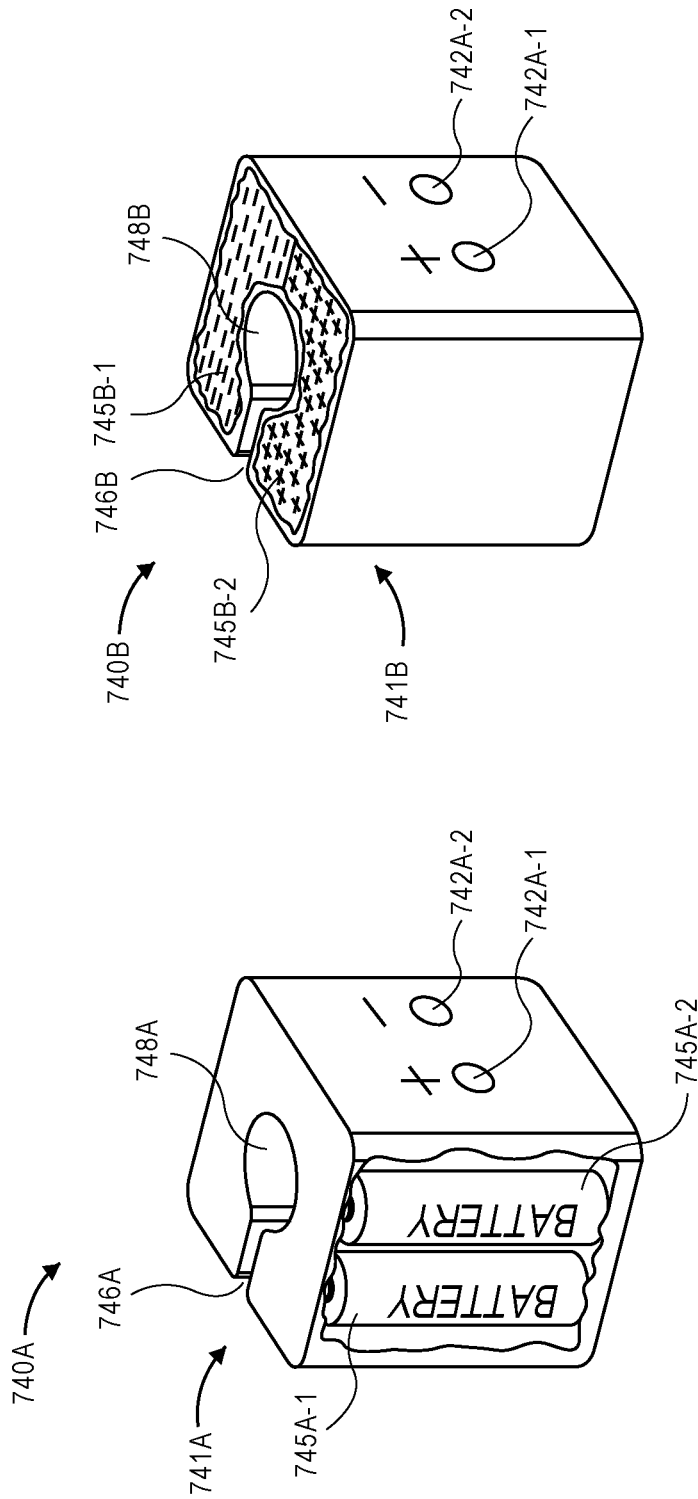
FIGS. 7A and 7B are views of aspects of one system including an aerial vehicle having a replaceable power module in accordance with embodiments of the present disclosure.

As is discussed above, power modules of the present disclosure may include customized or particular cells (e.g., positive electrodes, or cathodes, as well as negative electrodes, or anodes, and separators, or electrolytes, between the positive and negative electrodes) that are specific to the respective power modules. Alternatively, the power modules may include standardized power sources, such as batteries or other power cells that are commercially available, e.g., AAA, AA, C or D batteries, that may themselves be installed within or removed from the power modules as necessary. Referring to FIGS. 7A and 7B, replaceable power modules 740A, 740B in accordance with embodiments of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A through 6C, by the number "5" shown in FIG. 5, by the number "4" shown in FIGS. 4A through 4F, by the number "2" shown in FIG. 2 or by the number "1" shown in FIGS. 1A through 1G.

As is shown in FIG. 7A, the power module 740A includes a housing 741A having a plurality of batteries 745A-1, 745A-2 releasably installed therein, a slot 746A and a central opening 748A. A pair of terminals 742A-1, 742A-2 that are connected in series with positive and negative electrodes of the batteries 745A-1, 745A-2, respectively, extend from an interior of the housing 741A to an exterior of the housing 741A, which may be formed from any suitable materials, including but not limited to metals, plastics, rubbers and/or composite materials. The terminals 742A-1, 742A-2 extend through the housing 741A, and are provided for making mating contact with a pair of corresponding contacts or terminals of an electrical circuit provided aboard an aerial vehicle (not shown). The power module 740A further includes a slot 746A and a central opening 748A. The slot 746A is provided for alignment with a corresponding slot of an aerial vehicle, such that a tension member of an installer system (not shown) passing through the corresponding slot of the aerial vehicle may enter the central opening 748A of the power module 740A laterally. The power module 740A may include any type or form of internal electrical conductors (not shown) for transferring electrical current between any positive or negative electrodes of the batteries 745A-1, 745A-2 and the terminals 742A-1, 742A-2.

As is shown in FIG. 7B, the power module 740B includes a housing 741B having a pair of positive and negative cells 745B-1, 745B-2 permanently installed therein, a slot 746B and a central opening 748B. A pair of terminals 742B-1, 742B-2 that are connected in series with the positive and negative cells 745B-1, 745B-2, respectively, extend from an interior of the housing 741B to an exterior of the housing 741B, which may also be formed from any suitable materials, including but not limited to metals, plastics, rubbers and/or composite materials. The positive and negative cells 745B-1, 745B-2 may comprise any type, size or form of chemical ions, molecules or compounds (e.g., oxides, salts, acids or bases), and may be shaped for accommodation within available spaces of the housing 741B that are not occupied by the slot 746B or the central opening 748B. Alternatively, and in addition to batteries or battery cells, power modules of the present disclosure may include other standard or customized forms of power sources therein, including but not limited to fuel cells, turbines, solar cells or nuclear reactors.

Additionally, power modules of the present disclosure may have any shape or form. Referring to FIGS. 8A through 8C, views of replaceable power modules in accordance with embodiments of the present disclosure are shown. Except where otherwise noted, reference numerals preceded by the number "8" shown in FIGS. 8A through 8C indicate components or features that are similar to components or features having reference numerals preceded by the number "7" shown in FIGS. 7A and 7B, by the number "6" shown in FIGS. 6A through 6C, by the number "5" shown in FIG. 5, by the number "4" shown in FIGS. 4A through 4F, by the number "2" shown in FIG. 2 or by the number "1" shown in FIGS. 1A through 1G.

Referring to FIG. 8A, a power module 840A is shown. The power module 840A includes a pair of terminals 842A-1, 842A-2, a slot 846A and a central opening 848A, and may be releasably coupled to a tension member 862A via a releasable connector 868A. The power module 840A features a substantially circular cross section, and the terminals 842A-1, 842A-2 are aligned circumferentially around the power module 840A at different elevations with respect to a height of the power module 840A. Therefore, the power module 840A may be installed in a chamber or cavity of an aerial vehicle (not shown) having corresponding positive or negative contacts or terminals that are electrically coupled to one or more electrical circuits provided onboard the aerial vehicle at the same elevations with respect to a height of the chamber or cavity. As is shown in FIG. 8A, the releasable connector 868A may couple or join with an upper surface of the power module 840A, e.g., by mechanical, magnetic or other means. Alternatively, the releasable connector 868A may also engage with an underside of the power module 840A, e.g., by passing the tension member 862A through a corresponding slot in an aerial vehicle (not shown), and into the central opening 848A via the slot 846A, enabling the releasable connector 868A to also lift the power module 840A from a corresponding chamber or cavity within the aerial vehicle.

Referring to FIG. 8B, a power module 840B is shown. The power module 840B includes a positive terminal 842B-1, a negative terminal (not shown), a slot 846B and a central opening 848B. The power module 840B may be releasably coupled to a tension member 862B via a releasable connector 868B. The power module 840B features a substantially triangular cross section, and the positive terminal 842B-1 and the negative terminal (not shown) are aligned longitudinally along an entire height of the power module 840B. Therefore, the power module 840B may be installed in a chamber or cavity of an aerial vehicle (not shown) having positive or negative contacts or terminals provided on corresponding sides of the chamber or cavity.

For example, where the power module 840B includes the positive terminal 842B-1 and a negative terminal (not shown) on specific faces of the triangle cross section, the power module 840B may be used to energize electrical circuits provided onboard the aerial vehicle in just one orientation, e.g., only when the external face of the power module 840B including the positive terminal 842B-1 contacts an internal face of a chamber having a corresponding positive terminal, and when an external face of the power module 840B including the negative terminal (not shown) contacts an internal face of the chamber having a corresponding negative terminal. Furthermore, where a replaceable power module includes terminals extending for an entire height of the replaceable power module, such as the power module 840B, the replaceable power module may continue to energize electrical loads or circuits aboard the aerial vehicle as the replaceable power module is being withdrawn from a chamber by a tension member. Additionally, where the tension member further includes a substantially identical replacement power module suspended therefrom, the replacement power module may enter the chamber as the replaceable power module is being withdrawn therefrom, such that the replaceable power module and the replacement power module may briefly energize electrical loads or circuits aboard the aerial vehicle together in parallel until the replaceable power module has been withdrawn.

As is shown in FIG. 8B, the releasable connector 868B may couple or join with an upper surface of the power module 840B, e.g., by mechanical, magnetic or other means. Alternatively, the releasable connector 868B may also engage with an underside of the power module 840B, e.g., by passing the tension member 862B through a corresponding slot in an aerial vehicle (not shown), and into the central opening 848B via the slot 846B, thereby enabling the releasable connector 868B to also lift the power module 840B from a corresponding chamber or cavity within the aerial vehicle.

Referring to FIG. 8C, a power module 840C is shown. The power module 840C includes a negative terminal 842C-1, a positive terminal 842C-2, a slot 846C and a central opening 848C. The power module 840C may be releasably coupled to a tension member 862C via a releasable connector 868C. The power module 840C features a substantially circular cross section, and the negative terminal 842C-1 and the positive terminal 842C-2 provided asymmetrically on one side of the power module 840C. Therefore, the power module 840C may be installed in a chamber or cavity of an aerial vehicle (not shown) having positive or negative contacts or terminals provided in reciprocal locations within the chamber or cavity. For example, where the power module 840C includes the negative terminal 842C-1 and the positive terminal 842C-2 on specific faces of the circular cross section, the power module 840C may be used to energize electrical circuits provided onboard the aerial vehicle in just one orientation, e.g., only when the external face of the power module 840C including the negative terminal 842C-1 and the positive terminal 842C-2 contacts an internal face of a chamber having corresponding negative positive terminals.

As is shown in FIG. 8C, the releasable connector 868C has a hemispheric shape and may couple or join with an upper surface of the power module 840C, e.g., by mechanical, magnetic or other means. Alternatively, the releasable connector 868C may also engage with an underside 856C of the power module 840C, which has a corresponding hemispheric shape, e.g., by passing the tension member 862C through a corresponding slot in an aerial vehicle (not shown), and into the central opening 848C via the slot 846C, thereby enabling the releasable connector 868C to also lift the power module 840C from a corresponding chamber or cavity within the aerial vehicle.

Figure 9A:
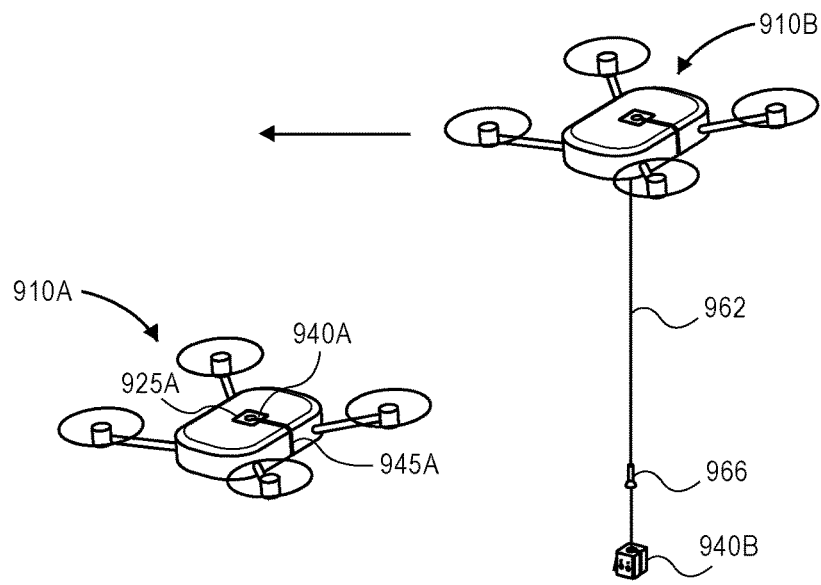
FIGS. 9A and 9B are views of aerial vehicles having replaceable power modules in accordance with embodiments of the present disclosure.
Figure 9B:
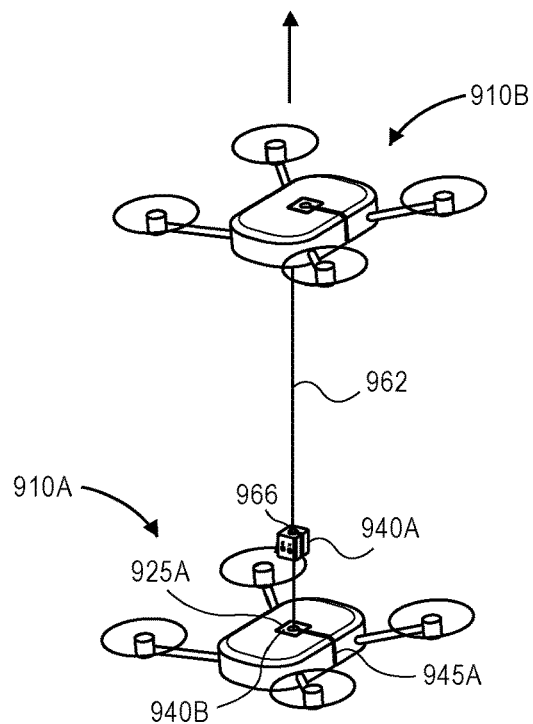

As is discussed above, replacement stations, transfer stations or other components for removing power modules from aerial vehicles in flight, or installing power modules into such aerial vehicles, may be provided in one or more ground-based stations, such as the transfer station 150 of FIG. 1B, or on one or more mobile vehicles, including but not limited to one or more other aerial vehicles. Referring to FIGS. 9A and 9B, views of aerial vehicles 910A, 910B having replaceable power modules in accordance with embodiments of the present disclosure are shown. Except where otherwise noted, reference numerals preceded by the number "9" shown in FIGS. 9A and 9B indicate components or features that are similar to components or features having reference numerals preceded by the number "8" shown in FIGS. 8A through 8C, by the number "7" shown in FIGS. 7A and 7B, by the number "6" shown in FIGS. 6A through 6C, by the number "5" shown in FIG. 5, by the number "4" shown in FIGS. 4A through 4F, by the number "2" shown in FIG. 2 or by the number "1" shown in FIGS. 1A through 1G.

As is shown in FIG. 9A, a first aerial vehicle 910A includes a replaceable power module 940A mounted within a chamber 925A, and a second aerial vehicle 910B includes a tension member 962 descending from an underside thereof. The first aerial vehicle 910A further includes a lateral slot 945A extending from an external perimeter of the aerial vehicle 910 to the chamber 925A. The tension member 962 includes an engagement capsule 966 and a replacement power module 940B coupled thereto.

In accordance with the present disclosure, the second aerial vehicle 910B may approach the first aerial vehicle 910A, and align the tension member 962 with the lateral slot 945A of the first aerial vehicle 910A. Relative motion between the second aerial vehicle 910B and the first aerial vehicle 910A may cause the tension member 962 to be inserted into the lateral slot 945A and pass into central openings within the chamber 925A and the replaceable power module 940A, with the engagement capsule 966 and the replacement power module descending below the first aerial vehicle 910A. For example, the first aerial vehicle 910A may engage in a hovering operation, and the second aerial vehicle 910B may maintain a substantially constant altitude while traveling toward the first aerial vehicle 910A. Alternatively, the second aerial vehicle 910B may engage in a hovering operation, and the first aerial vehicle 910A may maintain a substantially constant altitude while traveling toward the second aerial vehicle 910B. In yet another alternative, the tension member 962 may be inserted into the lateral slot 945A of the first aerial vehicle 910A with both the first aerial vehicle 910A and the second aerial vehicle 910B in motion.

As is shown in FIG. 9B, with the tension member 962 aligned within central openings of the chamber 925A and the replaceable power module 940A, the second aerial vehicle 910B may elevate with respect to the first aerial vehicle 910A, thereby causing the engagement capsule 966 to come into contact with the replaceable power module 940A, and lift the replaceable power module 940A from the chamber 925A. Subsequently, continued elevation of the second aerial vehicle 910B with respect to the first aerial vehicle 910A causes the replacement power module 940B to enter the chamber 925A from below. After the replacement power module 940B has been installed within the chamber 925A, the replacement power module 940B may power any number of electrical loads or circuits provided onboard the aerial vehicle 910A accordingly.

Figure 10:
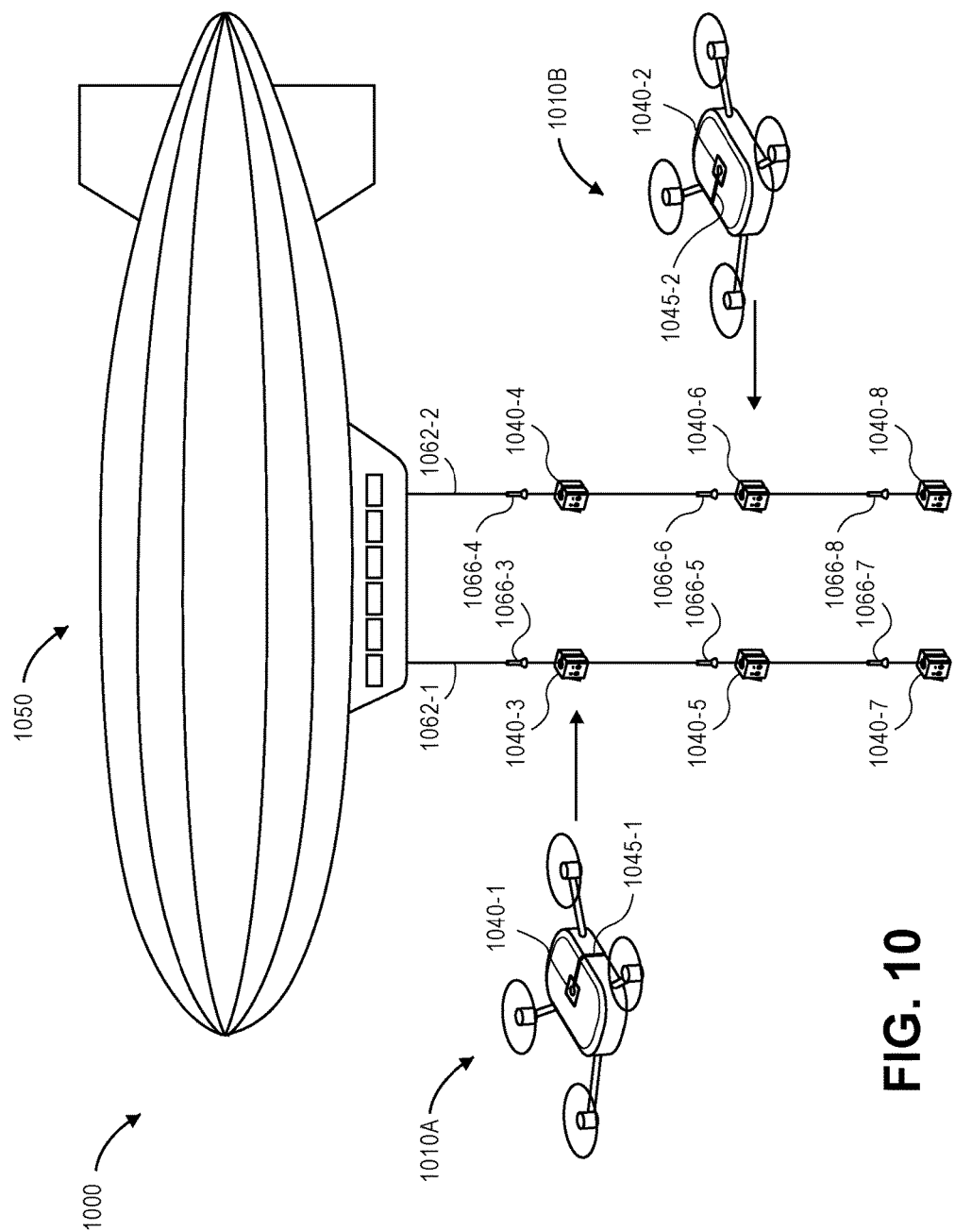
FIG. 10 is a view of one system including aerial vehicles having replaceable power modules in accordance with embodiments of the present disclosure.

An airborne replacement station or transfer station may service multiple aerial vehicles simultaneously. Referring to FIG. 10, a view of one system 1000 including aerial vehicles having replaceable power modules in accordance with embodiments of the present disclosure are shown. Except where otherwise noted, reference numerals preceded by the number "10" shown in FIG. 10 indicate components or features that are similar to components or features having reference numerals preceded by the number "9" shown in FIGS. 9A and 9B by the number "8" shown in FIGS. 8A through 8C, by the number "7" shown in FIGS. 7A and 7B, by the number "6" shown in FIGS. 6A through 6C, by the number "5" shown in FIG. 5, by the number "4" shown in FIGS. 4A through 4F, by the number "2" shown in FIG. 2 or by the number "1" shown in FIGS. 1A through 1G.

As is shown in FIG. 10, the system 1000 includes a pair of aerial vehicles 1010A, 1010B and a transfer station 1050 (viz., a blimp or dirigible). Each of the aerial vehicles 1010A, 1010B includes a replaceable power module 1040-1, 1040-2 installed within a chamber therein and a lateral slot 1045-1, 1045-2 extending from a perimeter of the aerial vehicles 1010A, 1010B to the chamber. The transfer station 1050 further includes a pair of tension members 1062-1, 1062-2 suspended therefrom. The tension member 1062-1 includes a plurality of engagement capsules 1066-3, 1066-5, 1066-7 mounted thereto, with each of the engagement capsules 1066-3, 1066-5, 1066-7 positioned above a corresponding replacement power module 1040-3, 1040-5, 1040-7. The tension member 1062-2 includes a plurality of engagement capsules 1066-4, 1066-6, 1066-8 mounted thereto, with each of the engagement capsules 1066-4, 1066-6, 1066-8 positioned above a corresponding replacement power module 1040-4, 1040-6, 1040-8.

In accordance with the present disclosure, the aerial vehicles 1010A, 1010B may independently or simultaneously exchange their replaceable power modules 1040-1, 1040-2 for one of the replacement power modules 1040-3, 1040-4, 1040-5, 1040-6, 1040-7, 1040-8. For example, as is shown in FIG. 10, the aerial vehicle 1010A may approach the tension member 1062-1, guide a portion of the tension member 1062-1 into the lateral slot 1045-1, and descend in elevation to cause one of the engagement capsules 1066-3, 1066-5, 1066-7 to contact an underside of the replaceable power module 1040-1 within a chamber of the aerial vehicle 1010A, thereby lifting the replaceable power module 1040-1 from the chamber, such as is shown in FIGS. 1A through 1G or in FIGS. 4B through 4F. The aerial vehicle 1010A may continue to descent with respect to the tension member 1062-1 until a corresponding one of the replacement power modules 1040-3, 1040-5, 1040-7 is elevated into the chamber, such as is also shown in FIGS. 1A through 1G or in FIGS. 4B through 4F.

Similarly, the aerial vehicle 1010B may also approach the tension member 1062-2, guide a portion of the tension member 1062-2 into the lateral slot 1045-2 and descend in elevation to cause one of the engagement capsules 1066-4, 1066-6, 1066-8 to contact an underside of the replaceable power module 1040-2 within a chamber of the aerial vehicle 1010B, thereby lifting the replaceable power module 1040-2 from the chamber, such as is shown in FIGS. 1A through 1G or in FIGS. 4B through 4F. The aerial vehicle 1010B may continue to descent with respect to the tension member 1062-2 until a corresponding one of the replacement power modules 1040-4, 1040-6, 1040-8 is elevated into the chamber, such as is also shown in FIGS. 1A through 1G or in FIGS. 4B through 4F.

Alternatively, the transfer station 1050 may be outfitted with one or more winches or like systems, such as the winch 164 of the transfer station 150 of FIG. 1B, for independently elevating the tension members 1062-1, 1062-2 with respect to one or more aerial vehicles, which may be hovering or otherwise maintaining constant altitudes. Furthermore, the transfer station 1050 may have any number of tension members, and each of such tension members may have any number of engagement modules for removing power modules from aerial vehicles, or power modules for installation into such aerial vehicles. Moreover, where a transfer station is provided aboard a land, sea or air-based vehicle, the transfer station may be configured to remove power modules from aerial vehicles or install power modules into aerial vehicles, even where the transfer station and/or the aerial vehicles are in motion.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Moreover, any of the individual components of any of the specific embodiments of the present disclosure described herein may be incorporated into and/or utilized in connection with any other embodiments of the present disclosure, even if such components or embodiments do not appear together in any one figure.

In some embodiments, electrical loads or circuits aboard an aerial vehicle may briefly lose power as a first power module is withdrawn from a chamber and before a second power module is installed therein. In some other embodiments, such loads or circuits may be temporarily energized by one or more permanent power modules provided aboard the aerial vehicle as a first power module is being removed and before a second power module has been installed therein. In still other embodiments, a chamber may be aligned and sized to accommodate all or portions of a second power module being removed therefrom while at least a portion of a first power module being withdrawn remains therein, such that the first power module and the second power module may temporarily energize such loads or circuits in parallel, without interruption, as the first power module is being replaced with the second power module.

Furthermore, although some of the embodiments disclosed herein reference the use of unmanned aerial vehicles in delivery operations, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use. Moreover, one or more of the embodiments disclosed herein may be utilized in any type of vehicle, including not only aerial vehicles but also ground-based vehicles (e.g., automobiles or autonomous mobile robots) or water vehicles (e.g., surface and undersea vessels, such as submarines).

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
a frame having a power module chamber, wherein the power module chamber defines a first substantially square cross section bounded by a first front side, a first rear side, a first left side and a first right side, wherein the power module chamber has an upper opening and a lower opening, and wherein one of the first front side, the first rear side, the first left side or the first right side comprises a first positive terminal and a first negative terminal for powering an electrical circuit;
at least one electric propulsion motor configured to receive power from the electrical circuit; and
a power module releasably installed within the power module chamber, wherein the power module comprises a housing defining a second substantially square cross section bounded by a second front side, a second rear side, a second left side and a second right side, wherein the second substantially square cross section corresponds to the first substantially square cross section, wherein one of the second front side, the second rear side, the second left side or the second right side comprises a second positive terminal extending through the housing and a second negative terminal extending through the housing, wherein the one of the second front side, the second rear side, the second left side or the second right side is aligned in contact with the one of the first front side, the first rear side, the first left side or the first right side, wherein the power module chamber is configured to receive the power module via the lower opening of the power module chamber, and wherein the power module chamber is configured to release the power module via the upper opening of the power module chamber,
wherein the second positive terminal is in contact with the first positive terminal when the power module is releasably installed within the power module chamber, and
wherein the second negative terminal is in contact with the first negative terminal when the power module is releasably installed within the power module chamber.

2. The unmanned aerial vehicle of claim 1, wherein the frame further comprises a first lateral slot extending laterally between a perimeter of the frame and the power module chamber, and
wherein the power module comprises a second lateral slot aligned with the first lateral slot when the power module is releasably installed within the power module chamber.

3. The unmanned aerial vehicle of claim 1, wherein the power module comprises at least one cathode electrically coupled to the second positive terminal and at least one anode electrically coupled to the second negative terminal.

4. The unmanned aerial vehicle of claim 1, wherein the housing comprises a retractable latch, and wherein the power module chamber comprises an opening for accommodating the retractable latch when the power module is releasably installed within the power module chamber.

5. An aerial vehicle comprising:
a frame having an upper surface and a lower surface, wherein the upper surface comprises a first opening and wherein the lower surface comprises a second opening;
an electrical circuit for powering at least one electrical load;
a first chamber having a first vertical slot extending between the first opening in the upper surface of the frame and the second opening in the lower surface of the frame; and
a first power module comprising a housing having at least a positive cell and at least one negative cell disposed therein, wherein the first power module is releasably installed within the first chamber,
wherein the first chamber is configured to receive at least the first power module via the second opening,
wherein the first chamber is configured to release at least the first power module via the first opening, and
wherein the first power module is electrically coupled to the electrical circuit when the first power module is releasably installed within the first chamber.

6. The aerial vehicle of claim 5, further comprising at least one of a propulsion motor or a control surface,
wherein the at least one electrical load includes the at least one of the propulsion motor or the control surface.

7. The aerial vehicle of claim 5, wherein the first vertical slot extends laterally between the first chamber and a perimeter of the frame.

8. The aerial vehicle of claim 7, wherein the housing further comprising a second chamber and a second vertical slot extending laterally between the second chamber and a perimeter of the housing, and
wherein the first vertical slot is aligned with the second vertical slot when the first power module is releasably installed within the first chamber.

9. The aerial vehicle of claim 8, wherein the housing comprises a replaceable battery releasably installed therein,
wherein the replaceable battery comprises the positive cell and the negative cell.

10. The aerial vehicle of claim 8, wherein an underside of the housing comprises a first surface having a shape corresponding to a second surface of an engagement device for removing the first power module from the first chamber via the first opening.

11. The aerial vehicle of claim 10, further comprising at least one angled retainer pivotably mounted below the first chamber at the lower surface,
wherein the at least one angled retainer is configured to pivot open upon contact with the second surface of the engagement device.

12. The aerial vehicle of claim 5, further comprising a first positive terminal of the electrical circuit on at least one inner surface of the first chamber and a first negative terminal of the electrical circuit on the at least one inner surface of the first chamber,
wherein the first power module comprises a second positive terminal of the at least one positive cell on at least one outer surface of the first power module and a second negative terminal of the at least one negative cell on the at least one outer surface of the first power module,
wherein the first positive terminal is in contact with the second positive terminal when the first power module is releasably installed within the first chamber, and
wherein the first negative terminal is in contact with the second negative terminal when the first power module is releasably installed within the first chamber.

13. The aerial vehicle of claim 12,
wherein the first power module further comprises at least one radial extension,
wherein the first chamber further comprises at least one spiraling channel extending between the lower surface of the frame and the upper surface of the frame about the first vertical opening,
wherein the at least one spiraling channel is configured to receive the at least one radial extension, and
wherein the first power module is releasably installed within the first chamber with the at least one radial extension inserted into the at least one spiraling channel.

14. The aerial vehicle of claim 5, further comprising a notch on at least one inner surface of the first chamber,
wherein the first power module further comprises a retractable latch on at least one outer surface of the housing, and
wherein the retractable latch extends into the notch when the first power module is releasably installed within the first chamber.

15. The aerial vehicle of claim 5, wherein the first chamber defines an inner cross section having a first shape, wherein the first power module defines an outer cross section having a second shape, and
wherein the second shape corresponds to the first shape.

16. The aerial vehicle of claim 15, wherein the first shape is one of a first circle, a first oval, a first triangle, a first hexagon or a first octagon, and
wherein the second shape is a corresponding one of a second circle, a second oval, a second triangle, a second hexagon or a second octagon.

17. The aerial vehicle of claim 5, further comprising a second power module electrically coupled to the electrical circuit,
wherein the second power module is at least one of releasably installed within a second chamber or permanently installed within the frame.

18. An aerial vehicle comprising:
a frame having a chamber, wherein the chamber extends between a first opening in an upper surface of the frame and a second opening in a lower surface of the frame, wherein the chamber has a substantially constant cross section defined by at least one internal surface, wherein the at least one internal surface comprises at least one positive terminal and at least one negative terminal for powering an electrical circuit;
at least one electrical load, wherein the at least one electrical load is configured to receive power from the electrical circuit; and
a first power module releasably installed within the chamber, wherein the first power module comprises a first housing having a first cross section that is consistent with the substantially constant cross section of the chamber, a first positive terminal disposed on an outer surface of the first housing and a first negative terminal disposed on the outer surface of the first housing,
wherein the first positive terminal is in contact with the at least one positive terminal of the chamber when the first power module is releasably installed within the chamber,
wherein the aerial vehicle is configured to release the first power module from the chamber via the first opening, and
wherein the aerial vehicle is configured to receive a second power module comprising a second housing having a second cross section that is consistent with the substantially constant cross section of the chamber, a second positive terminal disposed on an outer surface of the second housing and a second negative terminal disposed on the outer surface of the second housing within the chamber via the second opening.

19. The aerial vehicle of claim 18, wherein the substantially constant cross section of the chamber has a shape of one of a circle, an oval, a triangle, a hexagon or an octagon, and
wherein each of the first cross section and the second cross section has a shape in the one of the circle, the oval, the triangle, the hexagon or the octagon.

20. The aerial vehicle of claim 18, wherein the at least one electrical load comprises at least one of:
a control surface;
a control system; or
a propulsion motor.

* * * * *